US012561434B2

(12) United States Patent
Chhetri et al.

(10) Patent No.: US 12,561,434 B2
(45) Date of Patent: Feb. 24, 2026

(54) HEIDI: ML ON HYPERVISOR DYNAMIC ANALYSIS DATA FOR MALWARE CLASSIFICATION

(71) Applicant: Palo Alto Networks, Inc., Santa Clara, CA (US)

(72) Inventors: Sujit Rokka Chhetri, Santa Clara, CA (US); Akshata Krishnamoorthy Rao, Mountain View, CA (US); Daniel Raygoza, Seattle, WA (US); Esmid Idrizovic, Trumau (AT); William Redington Hewlett, II, Mountain View, CA (US); Robert Jung, Albuquerque, NM (US)

(73) Assignee: Palo Alto Networks, Inc., Santa Clara, CA (US)

( * ) Notice: Subject to any disclaimer, the term of this patent is extended or adjusted under 35 U.S.C. 154(b) by 241 days.

(21) Appl. No.: 17/715,572

(22) Filed: Apr. 7, 2022

(65) Prior Publication Data

US 2023/0325501 A1 Oct. 12, 2023

(51) Int. Cl.
| | |
|---|---|
| *G06F 21/56* | (2013.01) |
| *G06F 21/53* | (2013.01) |
| *G06N 5/01* | (2023.01) |
| *G06N 20/00* | (2019.01) |
| *G06N 20/20* | (2019.01) |

(52) U.S. Cl.
CPC ............ *G06F 21/566* (2013.01); *G06F 21/53* (2013.01); *G06F 2221/033* (2013.01); *G06N 20/00* (2019.01)

(58) Field of Classification Search
CPC .. G06F 21/566; G06F 21/53; G06F 2221/033; G06N 20/00

USPC ........................................................... 726/4
See application file for complete search history.

(56) References Cited

U.S. PATENT DOCUMENTS

| | | | |
|---|---|---|---|
| 7,089,391 B2 | 8/2006 | Geiger | |
| 7,568,233 B1 | 7/2009 | Szor | |
| 8,266,698 B1 * | 9/2012 | Seshardi | ................. G06F 21/53 |
| | | | 726/25 |
| 8,584,241 B1 * | 11/2013 | Jenks | .................... G06F 21/566 |
| | | | 726/23 |
| 8,875,295 B2 | 10/2014 | Lutas | |
| 9,104,867 B1 | 8/2015 | Thioux | |
| 9,104,868 B2 | 8/2015 | Dalcher | |
| 9,292,417 B2 | 3/2016 | Salsamendi | |

(Continued)

FOREIGN PATENT DOCUMENTS

| | | |
|---|---|---|
| CN | 113761531 | 12/2021 |
| EP | 3217306 | 9/2017 |

OTHER PUBLICATIONS

Kamalakanta Sethi; A Novel Malware Analysis Framework for Malware Detection and Classification using Machine Learning Approach; ACM: Year 2018; pp. 1-4.*

(Continued)

*Primary Examiner* — Monjur Rahim

(74) *Attorney, Agent, or Firm* — Van Pelt, Yi & James LLP

(57) ABSTRACT

The present application discloses a method, system, and computer system for detecting malicious files. The method includes executing a sample in a virtual environment, and determining whether the sample is malware based at least in part on memory-use artifacts obtained in connection with execution of the sample in the virtual environment.

25 Claims, 17 Drawing Sheets

(56) References Cited

U.S. PATENT DOCUMENTS

| | | | |
|---|---|---|---|
| 9,436,403 | B1 | 9/2016 | Zhang |
| 9,507,939 | B1 * | 11/2016 | Lukacs ................ G06F 21/566 |
| 9,584,541 | B1 * | 2/2017 | Weinstein .......... H04L 63/1441 |
| 9,679,136 | B2 | 6/2017 | Sallam |
| 10,397,261 | B2 | 8/2019 | Ikuse |
| 10,565,376 | B1 | 2/2020 | Jung |
| 10,628,586 | B1 | 4/2020 | Jung |
| 11,240,275 | B1 | 2/2022 | Vashisht |
| 11,256,808 | B2 | 2/2022 | Jung |
| 11,328,087 | B1 | 5/2022 | Allen |
| 11,620,384 | B2 | 4/2023 | Smith |
| 2005/0108733 | A1 | 5/2005 | Bermudez |
| 2007/0150957 | A1 | 6/2007 | Hartrell |
| 2008/0016339 | A1 | 1/2008 | Shukla |
| 2008/0195676 | A1 | 8/2008 | Lyon |
| 2011/0265182 | A1 | 10/2011 | Peinado |
| 2011/0289586 | A1 | 11/2011 | Kc |
| 2012/0255012 | A1 | 10/2012 | Sallam |
| 2012/0297057 | A1 | 11/2012 | Ghosh |
| 2012/0317647 | A1 | 12/2012 | Brumley |
| 2012/0324236 | A1 | 12/2012 | Srivastava |
| 2013/0097706 | A1 * | 4/2013 | Titonis ................ G06F 21/566 |
| | | | 726/22 |
| 2013/0232507 | A1 | 9/2013 | Farrugia |
| 2014/0013434 | A1 | 1/2014 | Ranum |
| 2014/0053267 | A1 | 2/2014 | Klein |
| 2014/0181975 | A1 | 6/2014 | Spernow |
| 2014/0189687 | A1 | 7/2014 | Jung |
| 2014/0237596 | A1 | 8/2014 | Volodymyr |
| 2015/0154398 | A1 | 6/2015 | Jones |
| 2015/0242626 | A1 | 8/2015 | Wang |
| 2015/0379263 | A1 | 12/2015 | Vipat |
| 2016/0021121 | A1 | 1/2016 | Cui |
| 2016/0147997 | A1 | 5/2016 | Dover |
| 2016/0156656 | A1 * | 6/2016 | Boggs ................ H04L 63/1416 |
| | | | 726/25 |
| 2016/0156658 | A1 * | 6/2016 | Thomas ................ G06F 21/56 |
| | | | 726/24 |
| 2016/0191550 | A1 | 6/2016 | Ismael |
| 2016/0232379 | A1 | 8/2016 | Edwards |
| 2016/0328742 | A1 | 11/2016 | Shiravi Khozani |
| 2017/0083701 | A1 | 3/2017 | Tajalli |
| 2017/0083703 | A1 * | 3/2017 | Abbasi ................ G06F 21/561 |
| 2017/0103202 | A1 | 4/2017 | Kim |
| 2017/0243000 | A1 | 8/2017 | Shraim |
| 2017/0270296 | A1 | 9/2017 | Kraemer |
| 2017/0289109 | A1 | 10/2017 | Caragea |
| 2017/0364685 | A1 | 12/2017 | Shah |
| 2018/0025157 | A1 | 1/2018 | Titonis |
| 2018/0096147 | A1 | 4/2018 | Ince |
| 2018/0181752 | A1 | 6/2018 | Guri |
| 2018/0183814 | A1 | 6/2018 | Sambandam |
| 2018/0204003 | A1 | 7/2018 | Adams |
| 2018/0218153 | A1 | 8/2018 | Edwards |
| 2018/0260562 | A1 | 9/2018 | Chen |
| 2018/0268130 | A1 | 9/2018 | Ghosh |
| 2019/0007436 | A1 | 1/2019 | Dods |
| 2019/0081963 | A1 | 3/2019 | Waghorn |
| 2019/0102540 | A1 | 4/2019 | Acar |
| 2020/0019703 | A1 * | 1/2020 | Saldanha .............. G06F 12/145 |
| 2020/0344261 | A1 * | 10/2020 | Yi ....................... H04L 63/1433 |
| 2020/0364338 | A1 | 11/2020 | Ducau |
| 2021/0126938 | A1 | 4/2021 | Trost |
| 2022/0083659 | A1 | 3/2022 | Ma |
| 2022/0164449 | A1 | 5/2022 | Saxe |
| 2022/0253526 | A1 | 8/2022 | Sanders |
| 2023/0325897 | A1 | 10/2023 | Dye |
| 2024/0070197 | A1 | 2/2024 | Lee |
| 2024/0137228 | A1 | 4/2024 | Davies |

OTHER PUBLICATIONS

Amna Mohd A Hameed. A Machine Learning Approach for Memory Forensic Investigation. School of Computer Science and Informatics Cardiff University 2020.

Bozkir et al. Catch them alive: A malware detection approach through memory forensics, manifold learning and computer vision. Computers & Security, vol. 103, Apr. 2021.

Catak et al. Deep learning based Sequential model for malware analysis using Windows exe API Calls. Peer J Comput. Sci., DOI 10.7717/peerj-cs.285. Jul. 27, 2020.

Christopher Kreugel, Evasive Malware Exposed and Deconstructed, RSA Conference 2015, San Francisco, Apr. 20-24, 2015.

Dongyan Xu, An Intergrated Architecture for Automatic Indication, Avoidance, Purdue University, Aug. 20, 2014, Final Report.

Fireeye, Tracking Malware with Import Hashing, Threat Research, Jan. 24, 2014, pp. 1-8.

Garfinkel et al., A Virtual Machine Introspection Based Architecture for Intrusion Detection, 2003.

Github, Erocarrera/Pefile: Pefile is a Python Module to Read and Work with PE (Portable Executable) Files, Jun. 30, 2021, pp. 1-5.

Github, Import Hash, Jun. 23, 2021.

GitHub, Pefile/Pefile.py at Master—Erocarrera/Pefile • GitHub, Jun. 30, 2021, pp. 1-160.

Kaspersky Lab. Machine Learning for Malware Detection. (2014).

Malachi Jones. Automated In-memory Malware/Rootkit Detection via Binary Analysis and Machine Learning. Feb. 16, 2018.

Mohaisen et al. AMAL: High-Fidelity, Behavior-based Automated Malware Analysis and Classification. Aug. 25, 2014.

Mohaisen et al. Network-based Analysis and Classification of Malware using Behavioral Artifacts Ordering. arXiv:1901.01185v1 [cs.CR] Jan. 4, 2019.

Mosli et al. Automated malware detection using artifacts in forensic memory images. 2016 IEEE Symposium on Technologies for Homeland Security (HST). Date of Conference: May 10-11, 2016. Date Added to IEEE Xplore: Sep. 15, 2015.

Sihwail et al. Malware Detection Approach Based on Artifacts in Memory Image and Dynamic Analysis. Appl. Sci. 2019, 9, 3680; doi:10.3390/app9183680. Sep. 5, 2019.

Teller et al. Enhancing Automated Malware Analysis Machines with Memory Analysis. Security Innovation Group Check Point Software Technologies. (2014).

Trend Micro. A Machine Learning Model for Detecting Malware Outbreaks Using Only a Single Malware Sample. Security Technology, Research, Machine Learning. Aug. 7, 2019.

Willems et al., CXPInspector: Hypervisor-Based, Hardware-Assisted System Monitoring, Ruhr-Universitat Bochum, Horst Gortz Institute for IT Security, Nov. 26, 2012.

Yerima et al. Machine learning-based dynamic analysis of Android apps with improved code coverage. EURASIP Journal on Information Security https://doi.org/10.1186/s13635-019-0087-1. 2019:4 (2019).

Cabau et al., Malware Classification Based on Dynamic Behavior, 18th International Symposium on Symbolic and Numeric Algoritluns for Scientific Computing, 2015, pp. 315-318.

* cited by examiner

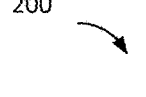

200

┌─────────────────────────────────────────────────────────────┐
│                              ┌─205                            │
│  ┌──────────────────────────────────────────────────────┐    │
│  │              COMMUNICATION INTERFACE                   │    │
│  └──────────────────────────────────────────────────────┘    │
│                            ↕                                   │
│                                          ┌─210                 │
│  ┌──────────────────────────────────────────────────────┐    │
│  │                   PROCESSOR(S)                         │    │
│  │   225─                          227─                   │    │
│  │  ┌──────────────────┐    ┌──────────────────────┐      │    │
│  │  │  COMMUNICATION   │    │  VIRTUAL ENVIRONMENT  │      │    │
│  │  │     MODULE       │    │       MODULE          │      │    │
│  │  └──────────────────┘    └──────────────────────┘      │    │
│  │   229─                          231─                   │    │
│  │  ┌──────────────────┐    ┌──────────────────────┐      │    │
│  │  │ DYNAMIC ANALYSIS │    │   FEATURE VECTOR      │      │    │
│  │  │     MODULE       │    │ DETERMINING MODULE    │      │    │
│  │  └──────────────────┘    └──────────────────────┘      │    │
│  │   233─                          235─                   │    │
│  │  ┌──────────────────┐    ┌──────────────────────┐      │    │
│  │  │ MODEL TRAINING   │    │  PREDICTION MODULE    │      │    │
│  │  │     MODULE       │    │                       │      │    │
│  │  └──────────────────┘    └──────────────────────┘      │    │
│  │   237─                          239─                   │    │
│  │  ┌──────────────────┐    ┌──────────────────────┐      │    │
│  │  │NOTIFICATION MODULE│   │ SECURITY ENFORCEMENT  │      │    │
│  │  │                  │    │       MODULE          │      │    │
│  │  └──────────────────┘    └──────────────────────┘      │    │
│  └──────────────────────────────────────────────────────┘    │
│          ↕                              ↕                      │
│   ┌─215                          ┌─220                         │
│  ┌────────────────────┐      ┌────────────────────┐           │
│  │     STORAGE        │      │      MEMORY        │           │
│  │ ┌────────────────┐ │260   │ ┌────────────────┐ │270        │
│  │ │ FILESYSTEM DATA│ │      │ │   EXECUTING    │ │           │
│  │ └────────────────┘ │262   │ │ APPLICATION    │ │           │
│  │ ┌────────────────┐ │      │ │     DATA       │ │           │
│  │ │ EXECUTION DATA │ │      │ └────────────────┘ │           │
│  │ └────────────────┘ │264   │                    │           │
│  │ ┌────────────────┐ │      │                    │           │
│  │ │  MODEL DATA    │ │      │                    │           │
│  │ └────────────────┘ │      │                    │           │
│  └────────────────────┘      └────────────────────┘           │
└─────────────────────────────────────────────────────────────┘

FIG. 2

```
{
  "proc": "55",
  "snapshot": 0,
  "addr": 586088,
  "desc": "wow64.dll - Wow64ApcRoutine",  ← API invoked
  "mem_type": "Stack"  ← Location in memory
}
```

```
"proc": "54",
"snapshot": 1,
"addr": 4268032,
"desc": " (hw:WX): 7 pages",  ← Permission change
"mem_type": "Executable"  ← Memory location
```

```
25 <Permission> <Location> pair
page change counts
```

```
"api_vector_hash_values": [
        "kernel32.createfilew",
        "kernel32.getfilesize",
        "kernel32.readfile",
        "kernel32.closehandle",
        "kernel32.waitforsingleobject",
        "kernel32.terminateprocess",
        "kernel32.getmodulefilenamew",
        "kernel32.loadlibraryw",
                "kernel32.sleep",
]
```

Tokens created by extracting Ngrams (2,3,4) and skipgrams (1,2,3) of API pointers per API vector

HEIDI: ML ON HYPERVISOR DYNAMIC ANALYSIS DATA FOR MALWARE CLASSIFICATION

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 2 is a block diagram of a system to detect a malicious file according to various embodiments.

FIG. 3A is an illustration of an API pointer corresponding to an example file.

FIG. 3C is an illustration of a page permission modification of an example file.

FIG. 3D is an illustration of an API vector corresponding to an example file.

DETAILED DESCRIPTION

Figure 1:
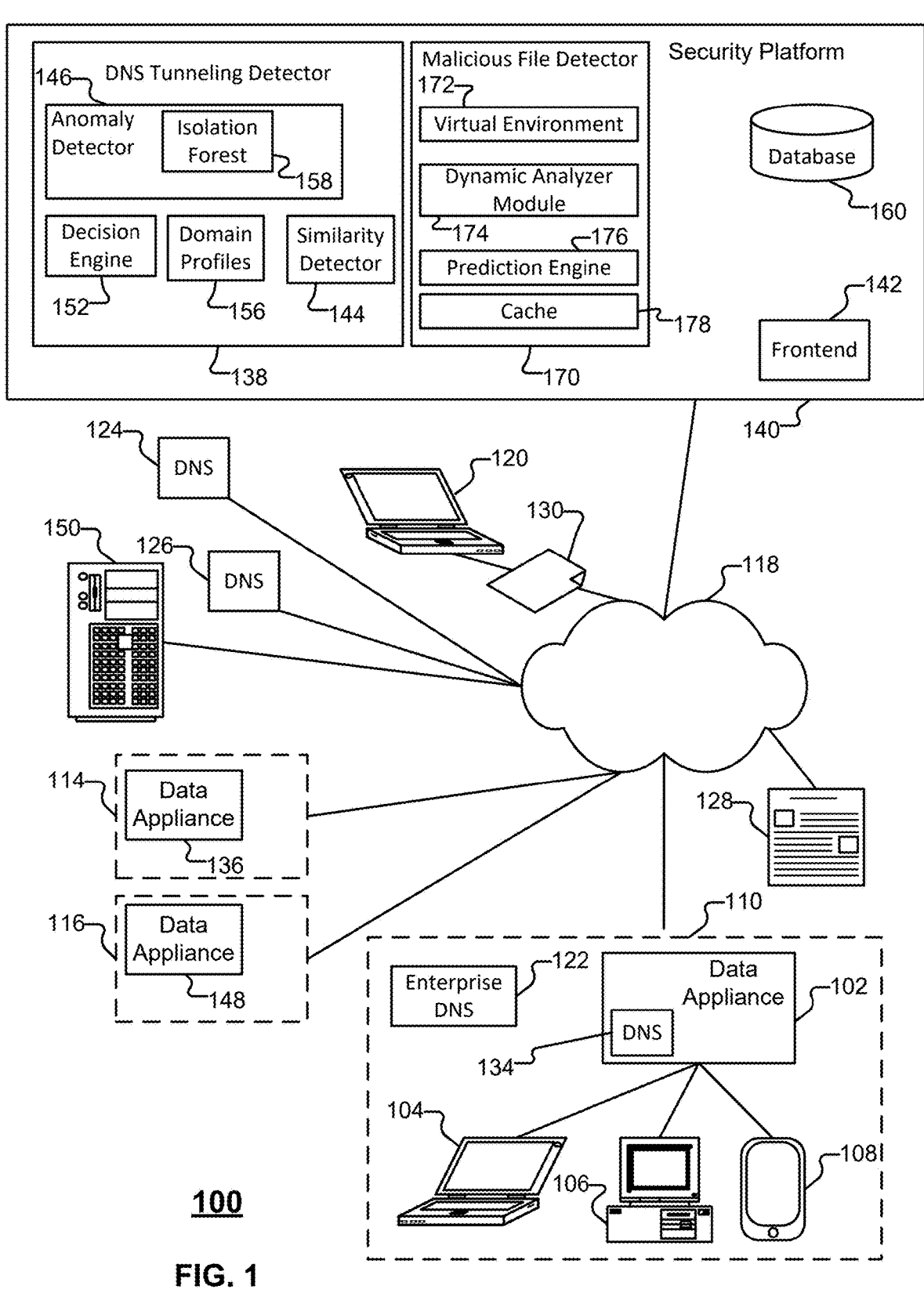
FIG. 1 is a block diagram of an environment in which a malicious file is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, malware refers to an application that engages in behaviors, whether clandestinely or not (and whether illegal or not), of which a user does not approve/would not approve if fully informed. Examples of malware include trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

As used herein, sandbox refers to a testing environment that isolates files executing within the testing environment from parts of a system that reside outside the testing environment. For example, the software code executed within the sandbox is executed without affecting network resources or local application of a system. In some embodiments, the sandbox is a virtual machine (e.g., a virtual machine that is isolated from other system resources, etc.).

According to related art, malware is identified using machine learning models. Machine learning models according to related art are trained/developed based using structures of files such as portable executable (PE) structures based on features such as imports, headers and sections, etc. However, some malware may perform anti-emulation or dynamic analysis evasion techniques. For example, some malware is caused to crash to evade an emulation dynamic analysis of the malware.

Various embodiments include a system or method to detect a malicious file (e.g., determine whether a particular file is malicious) based at least in part on a dynamic analysis. The dynamic analysis can be implemented using techniques described in U.S. patent application Ser. No. 15/701,331 and U.S. patent application Ser. No. 15/828,172, the entireties of which are hereby incorporated herein for all purposes. The dynamic analysis may include using data extracted from running a sample in a sandbox. For example, malware samples cannot evade the sandbox and the evasion techniques employed by malware may not be triggered because of the dynamic analysis such as an analysis of memory structures modified/invoked, or artifacts created based on execution of the malware in the sandbox.

A system, method, and/or device for detecting a malicious file is disclosed. The system includes one or more processors and a memory coupled to the one or more processors and configured to provide the one or more processors with instructions. The one or more processors are configured to execute a sample in a virtual environment, and determine whether the sample is malicious based at least in part on memory-use artifacts obtained in connection with execution of the sample in the virtual environment.

A system, method, and/or device for detecting a malicious file is disclosed. The system includes one or more processors and a memory coupled to the one or more processors and configured to provide the one or more processors with instructions. The one or more processors are configured to (i) receive a sample, (ii) execute the sample in a virtual environment, (iii) determine whether the sample is malicious based at least in part on memory-use artifacts obtained in connection with execution of the sample in the virtual environment, and (iv) in response to determining that the sample is malicious, provide an indication that the sample is malicious. In response to obtaining the indication that the sample is malicious the system, or security entity/endpoint in communication with the system, enforces one or more security policies based on a determination of whether the sample is malicious.

According to various embodiments, the system for detecting a malicious file is implemented by one or more servers. The one or more servers may provide a service for one or more customers and/or security entities. For example, the one or more servers detect malicious files or determine/assess whether files are malicious, and provide an indication of whether a file is malicious to the one or more customers and/or security entities. The one or more servers provide to a security entity the indication that a file is malicious in response to a determination that the file is malicious and/or in connection with an updated to a mapping of files to indications of whether the files of malicious (e.g., an update to a blacklist comprising identifier(s) associated with a malicious file(s)). As another example, the one or more servers determine whether a file is malicious in response to a request from a customer or security for an assessment of whether a file is malicious, and the one or more servers provide a result of such a determination. In some embodiments, in response to determining that a file is malicious, the system updates a mapping of representative information/identifiers of files to malicious files to include a record or other indication that the file is malicious. The system can provide the mapping to security entities, end points, etc.

According to various embodiments, the system for detecting a malicious file is implemented by a security entity. For example, the system for detecting a malicious file is implemented by a firewall. As another example, the system for detecting the malicious file is implemented by an application such as anti-malware application running on a device (e.g., a computer, laptop, mobile phone, etc.). According to various embodiments, the security entity receives a file, causes the file to be executed in a sandbox, obtains information pertaining to the execution of the file (e.g., behavior of the file during execution, artifacts created during execution, such as changes made to memory structures during execution, etc.), and determines whether the file is malicious based at least in part on information pertaining to the execution of the file. In response to determining that the file is malicious, the security entity applies one or more security entities with respect to the file. In response to determining that the file is not malicious (e.g., that the file is benign), the security entity handles the file as non-malicious traffic. In some embodiments, the security entity determines whether a file is malicious based at least in part on performing a lookup with respect to a mapping of representative information or identifier of the file (e.g., a hash computed that uniquely identifies the file, or another signature of the file) to malicious files to determine whether the mapping comprises a matching representative information or identifier of the file (e.g., that the mapping comprises a record for a file having a hash of that matches the computed hash for the received file). Examples of a hashing function to determine a hash corresponding to the file include a SHA-256 hashing function, an MD5 hashing function, an SHA-1 hashing function, etc. Various other hashing functions may be implemented.

In some embodiments, the system determines whether the file is malicious based at least in part on determining information pertaining to the execution of the file, such as memory artifacts generated by the sample during execution within the sandbox. The memory artifacts may include one or more of (i) application programming interface (API) pointers, (ii) API vectors, (iii) page permission modifications, and/or (iv) operating system (OS) structure modifications. The API pointers correspond to pointers to APIs in memory, and indicate the set or types of APIs that the corresponding file is intending to use. The API vectors can correspond to contiguous lists of API pointers in memory.

Malware generally tends to allocate blocks of memory for dynamically resolving features. Accordingly, similar API vectors can be indicative of shared code across malware. The page permission modifications can indicate whether the file (e.g., the malware) is modifying system memory to convert read only memory to writable/executable memory in connection with dynamically writing and executing code (e.g., a shellcode). The modification of page permissions is generally used in packed malware and malware that tends to extract and execute a payload. The OS structure modifications can indicate if the file (e.g., the malware) is attempting to hide its presence by modifying the loaded process module list.

In response to determining the memory artifacts, the system provides information pertaining to the memory artifacts to a classifier. The classifier is used to determine whether the file is malicious based at least in part on the information pertaining to the memory artifacts. In some embodiments, the classifier is a machine learning classifier, such as a classifier that is trained using a machine learning process. The execution traces corresponding to execution of the file can be very large. As an average size of an artifact JSON can be approximately 1.5 MB, and the volume can be 0.7-1.2 M samples, thereby corresponding to approximately 1.8 TB. As another example, in the case of analyzing approximately 220,000 benign samples, an average number of API vectors is 10.42, an average API vector length is greater than 50 (e.g., equal to 89.32), and a total number of unique API pointers is 33895; and in the case of analyzing approximately 89,000 malicious samples, an average number of API vectors is 4.23, an average API vector length is 86.60, and a total number of unique API pointers is 10099; a total number of common API pointers between malicious samples and benign samples is about 9519. Accordingly, parsing the execution traces to determine relationships among different characteristics of such traces that are indicative of, or consistent with, malicious files can be difficult. A machine learning system can be implemented to train the classifier. The information pertaining to the memory artifacts may correspond to a feature vector. For example, a feature vector may be generated with respect to each of the one or more of (i) API pointers, (ii) API vectors, (iii) page permission modifications, and/or (iv) OS structure modifications. In some embodiments, a combined feature vector is generated based at least in part on the respective feature vectors for the one or more of (i) API pointers, (ii) API vectors, (iii) page permission modifications, and/or (iv) operating system (OS) structure modifications. The combined feature vector may be a concatenation of the respective feature vectors for the one or more of (i) API pointers, (ii) API vectors, (iii) page permission modifications, and/or (iv) OS structure modifications.

In some embodiments, the system receives historical information pertaining to a maliciousness of a file (e.g., historical datasets of malicious files and historical datasets of benign files) from a third-party service such as VirusTotal®. The third-party service may provide a set of files deemed to be malicious and a set of files deemed to be benign. As an example, the third-party service may analyze the file and provide an indication whether a file is malicious or benign, and/or a score indicating the likelihood that the file is malicious. The system may receive (e.g., at predefined intervals, as updates are available, etc.) updates from the third-party service such as with newly identified benign or malicious files, corrections to previous mis-classifications, etc. In some embodiments, an indication of whether a file in the historical datasets corresponds to a social score such as a community-based score or rating (e.g., a reputation score) indicating that a file is malicious or likely to be malicious. The system can use the historical information in connection with training the classifier (e.g., the classifier used to determine whether a file is malicious based at least on the memory artifacts generated by the file during execution).

According to various embodiments, a security entity and/or network node (e.g., a client, device, etc.) handles a file based at least in part on an indication that the file is malicious and/or that the file matches a file indicated to be malicious. In response to receiving indication that the file (e.g., the sample is malicious), the security network and/or network node may update a mapping of files to an indication of whether the corresponding file is malicious, and/or a blacklist of files. In some embodiments, the security entity and/or the network node receives a signature pertaining to a file (e.g., a sample deemed to be malicious), and the security entity and/or the network node stores the signature of the file for use in connection with detecting whether files obtained, such as via network traffic, are malicious (e.g., based at least in part on comparing a signature generated for the file with a signature for a file comprised in a blacklist of files). As an example, the signature may be a hash.

Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' PA Series next generation firewalls, Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS), and CN Series container next generation firewalls, which support various commercial container environments, including for example, Kubernetes, etc.). For example, virtualized firewalls can support similar, or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

The system improves detection of malicious files. Further, the system further improves the handling of network traffic by preventing (or improving prevention of) malicious files being across a network such as among nodes within a network, or preventing malicious files from entering a network. The system determines that files that are deemed to be malicious or likely to be malicious such as based on a dynamic analysis of execution of the file within a sandbox and/or memory artifacts generated in connection with execution of the file. Related art detection techniques that use a static analysis such as an analysis of a structure of the file (e.g., a header of the file, etc.) for a file may be insufficient/inaccurate with respect to files the employ sandbox detection and evasion techniques to suppress analysis. (e.g., such as a forced crash in response to detection of the sandbox). For example, related art systems implement in-guest hooking (e.g., a kernel drive in an operating system of the virtual machine corresponding to the sandbox) to observe execution of the file within a sandbox. The related art systems are built on in-guest analysis logs. Accordingly, related art systems are limited to API calls, process creations, and file and registry updates. The related art systems cannot use OS level feature such as page permissions because the in-guest analysis does not have such visibility. Various embodiments implement an out of guest hooking to observe execution of the file within a sandbox (e.g., an observation from outside the sandbox such as by a process running on the host machine outside of the OS kernel for the sandbox instantiated). For example, various embodiments observe the execution to identify memory artifacts such as APIs invoked, page permission changes, and modifications to the OS structure in process memory. Further, the system can provide accurate and low latency updates to security entities (e.g., endpoints, firewalls, etc.) to enforce one or more security policies (e.g., predetermined and/or customer-specific security policies) with respect to traffic comprising malicious files. Accordingly, the system prevents proliferation of malicious traffic (e.g., files) to nodes within a network.

Various embodiments that detect malicious files based at least in part on API vectors monitored during execution of the sample. During a testing of implementations of embodiments that use feature vectors associated with API vectors were able to detect malicious files not identified by related art systems that use static analysis or that use dynamic analysis without use of API vectors. For example, 27% of samples not detected by related art systems were identified by implementations of various embodiments. Various embodiments can be optimized to detect malicious files across all files or types of files, or optimized with respect to files for which related art system are unable or ineffective with respect to detecting malicious files.

FIG. 1 is a block diagram of an environment in which a malicious file is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in a security platform. Client device 120 is a laptop computer present outside of enterprise network 110.

Data appliance 102 can be configured to work in cooperation with a security platform 140. The security platform 140 may be a remote security platform (e.g., with respect to devices or systems for which security platform provides a service such as malware detection). Security platform 140 can provide a variety of services, including performing static and dynamic analysis on malware samples, providing a list of signatures of known-malicious files to data appliances, such as data appliance 102 as part of a subscription, detecting malicious files (e.g., an on-demand detection, or a periodical based updates to a mapping of files to indications of whether the file is malicious or benign), providing a likelihood that a file is malicious or benign, provide/update a whitelist of files deemed to be benign, provide/update files deemed to be malicious, identifying malicious domains, detecting malicious files, predicting whether a file is malicious, and providing an indication of that a file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

According to various embodiments, security platform 140 comprises DNS tunneling detector 138 and/or malicious file detector 170. Malicious file detector 170 is used in connection with determining whether a file is malicious. In response to receiving a sample, malicious file detector 170 analyzes the file, or the execution of the file, and determines whether the file is malicious. For example, malicious file detector 170 performs a dynamic analysis with respect the file in order to determine whether the file is malicious. The malicious file detector 170 determine whether the file is malicious based at least in part on memory-use artifacts obtained in connection with execution of the file. In some embodiments, malicious file detector 170 executes the file in a sandbox (e.g., a virtual environment), and obtains the memory-use artifacts, such as by using an out of guest analysis. In some embodiments, malicious file detector 170 receives a file, and obtains information pertaining to API vectors based at least in part on an execution of the file, and the system uses the information pertaining to API vectors in connection with determining whether the file is malicious. Malicious file detector 170 can obtain a feature vector corresponding to the API vectors comprised in the memory artifacts generated during execution of the file. Malicious file detector 170 can use the feature vector corresponding to the API vector in connection with determining whether the file is malicious. Related art systems that use static analysis, such as an analysis of a structure of a file, do not include an analysis/consideration of API vectors because APIs are exposed when a file is run. In some embodiments, malicious file detector 170 comprises one or more of virtual environment 172, dynamic analyzer module 174, prediction engine 176, and/or cache 178.

Virtual environment 172 is used in connection with isolating execution of a file being analyzed. In some embodiments, malicious file detector 170 instantiates a virtual environment 172 specifically in connection with determining whether a file is malicious. The virtual environment can be a sandbox. In response to receiving a file for which malicious file detector 170 is to determine whether a file is malicious (or a likelihood that a file is malicious), malicious file detector 170 causes the file to be executed within virtual environment 172. Virtual environment 172 can store information pertaining to execution of the file within virtual environment 172. For example, execution traces corresponding to the execution of the file are stored. The virtual environment 172 is instrumented, as applicable, such that behaviors observed while the file/application is executing are logged and/or monitored (e.g., intercepting/hooking system call/API events).

Monitoring changes in memory after a system call event during execution of a malware sample in the computing environment is performed. For example, each time one of these functions/selected system APIs is called, the call stack can be inspected to determine whether any return address in the call stack points to a memory address that has changed since the first/previous image of memory was performed, and if so, another snapshot can be performed which can be utilized to identify a subset of the pages in memory that have changed since the first/previous image of memory. The techniques of snapshotting in memory based upon system call events can efficiently and effectively facilitate automatic detection of unpacking of code in memory during execution of the malware sample in the computing environment.

Various techniques can be performed to capture all process memory, such as by walking the page table, comparing each page in the page table to see if any changes are detected in the page contents, and if so generating a snapshot of the page (e.g., creating an image/dump that can be stored in a page cache to only image/dump pages that have changed, which in the Microsoft Windows® operating system (OS) platform can be performed using a virtual query to enumerate the relevant pages in memory). Also, in some cases, OS libraries can be filtered out to avoid caching pages associated with such OS libraries (e.g., as such are generally not associated with malware binaries). As further described below, comparing all subsequent return addresses against a previous snapshot is performed to determine whether to perform another snapshot (e.g., image/dump) of the relevant pages in memory based on system API calls (e.g., selected system API calls that are monitored (e.g., intercepted/hooked) as further described below).

The dynamic analysis can include instrumenting or "hooking" a subset of all functions exposed by the system API in the process memory is performed. This can optionally also be implemented via instrumenting processor architecture specific events that indicate a transition to the OS kernel is happening. For example, on an Intel x86 device running the Microsoft Windows® OS platform, the "SYSENTER" or "SYSCALL" events from the monitored process would indicate kernel transitions.

During a monitored emulation of the malware sample (e.g., execution of the malware sample in an instrumented virtualized execution environment, which can be allowed to execute in the instrumented virtualized execution environment for one, five, ten minutes, or some other period of time or until de-obfuscated malware is detected), each time one of these functions/selected system APIs is called, the call stack is inspected to determine whether any return address in the call stack points to a memory address that has changed since the first image of memory is performed. For example, this can be implemented by walking the stack to check all return addresses if code existed in a previous snapshot of memory, if no return addresses point to changes in code, then the malware analysis processing can continue (iteratively) malware sample execution without taking another snapshot of one or more memory pages. However, if a return address points to changes in code, then another snapshot of the relevant page(s) in memory can be performed as described below.

If memory at any of the return address locations differs from the memory in the initial memory image, then the malware is executing potentially unpacked code and the memory is reimaged and the unpacked code can be parsed from the dumped memory. As such, the disclosed techniques can efficiently only perform snapshots of memory after a selected system event/API call is detected and walking the stack reveals one or more return addresses indicating changes to the code in the memory (e.g., as such is an indicator of potential unpacking behavior detected by the malware analysis system during the monitored execution of the malware sample).

The process of snapshotting the memory is performed iteratively in that once a snapshot of the unpacked code is taken, the processing continues (e.g., iteratively) to monitor for additional layers of unpacking. After each time that unpacked code is detected as described above and a snapshot is taken, comparing all subsequent return addresses against the previous snapshot is performed. It should be noted that it is relatively common for malware to have multiple payloads that can be de-obfuscated in memory.

As will be apparent, the disclosed techniques can be applied to Microsoft Windows® OS platform environments, or similarly applied to various other OS platform environments, such as Apple Mac® OS, Linux, Google Android® OS, and/or other platforms, as would now be apparent to one of ordinary skill in the art in view of the disclosed embodiments.

In some embodiments, the snapshotting in memory includes performing an initial snapshot with respect to a set of characteristics of the memory (e.g., all of the plurality of pages in memory associated with the process) and the initial snapshot is cached to provide a baseline for the contents in memory while executing the sample. A set of one or more other snapshots can be captured during execution of the file in the sandbox. For example, another snapshot is performed after a system call/API event if any return address in a call stack points to a memory address that has changed since a previous snapshot (e.g., the baseline snapshot taken). For example, each time one of these functions/selected system APIs is called, the call stack can be inspected to determine whether any return address in the call stack points to a memory address that has changed since the first/previous image of memory was performed. In an example implementation, this can be performed by walking the stack to check all return addresses if code existed in a previous snapshot of memory, and if no return addresses point to changes in code, then the malware analysis processing can continue (iteratively) without taking another snapshot of one or more memory pages. However, if a return address points to changes in code, then another snapshot of the relevant page(s) in memory can be performed, as similarly described above.

Dynamic analyzer module 174 is used in connection with performing a dynamic analysis of the file, such as analyzing a behavior of the file during execution within virtual environment 172. Dynamic analyzer module 174 can comprise one or more dynamic analysis engines directly. In other embodiments, dynamic analysis is performed by a separate dynamic analysis server that includes a plurality of workers (i.e., a plurality of instances of dynamic analyzer module 174). The behavior of the file during execution can be recorded in memory artifacts associated with a memory structure of virtual environment 172. In embodiments, dynamic analyzer module 174 obtains information pertaining to execution of the file in virtual environment 172, including one or more of (i) API pointers, (ii) API vectors, (iii) page permission modifications, and/or (iv) OS structure modifications. In response to dynamic analyzer module 174 obtaining information pertaining to execution of the file, malicious file detector 170 provides such information to prediction engine 176. Malicious file detector 170 can be configurable (e.g., by an administrator or other system, etc.) such as with respect to the types of information pertaining to execution of the file to be obtained by dynamic analyzer module 174 and/or used in connection with determining whether a file is malicious. In some embodiments, malicious file detector 170 determines whether a file is malicious based at least on information pertaining to at least the API vectors corresponding to execution of the file.

Each dynamic analyzer module 174 manages a virtual machine instance (e.g., a corresponding virtual environment 172). In some embodiments, results of static analysis (e.g., performed by static analysis engine), whether in report form and/or as stored, such as in database, are provided as input to a dynamic analyzer module 174. For example, the static analysis report information can be used to help select/customize the virtual machine instance used by dynamic analyzer module 174 (e.g., Microsoft Windows XP Service Pack 3 vs. Windows 7 Service Pack 2). Where multiple virtual machine instances are executed at the same time, a single dynamic analysis engine can manage all of the instances, or multiple dynamic analysis engines can be used (e.g., with each managing its own virtual machine instance), as applicable. In some embodiments, the collected information is stored in one or more database records for the candidate malware (e.g., in database 160), instead of or in addition to a separate dynamic analysis (DA) report being created (i.e., portions of the database record form the dynamic analysis report).

For example, during a dynamic analysis phase, dynamic analyzer module 174 can utilize unpack/snapshot engine to automatically unpack and selectively snapshot process pages in memory during emulation of the file (e.g., malware sample) as similarly described herein. The snapshotted memory pages can be stored in cache 178. The output of the dynamic analysis including the efficient program de-obfuscation through system API instrumentation can be provided as input to a de-obfuscation analysis engine(s) for reassembling the cached memory pages, analyzing of the reassembled cached memory pages, and generating a signature based on a static analysis the reassembled cached memory pages (e.g., in an example implementation, the static analysis can be performed using static analysis engine(s)). The generated signature can be added to database 160.

Prediction engine 176 is used to determine whether the file is malicious. Prediction engine 176 uses information pertaining to execution of the file (e.g., memory artifacts or other information determined based on an analysis of the memory structure of the sandbox in which the file is executed) in connection with determining whether the corresponding file is malicious. For example, prediction engine 176 obtains information pertaining to the execution of file such as the information that is determined by dynamic analyzer module 174 (e.g., one or more of (i) API pointers, (ii) API vectors, (iii) page permission modifications, and/or (iv) OS structure modifications). In some embodiments, prediction engine 176 determines a set of one or more feature vectors based at least in part on information pertaining to the execution of file. For example, prediction engine 176 determines feature vectors for (e.g., characterizing) the one or more of (i) API pointers, (ii) API vectors, (iii) page permission modifications, and/or (iv) OS structure modifications. Prediction engine 176 can determine a feature vector corresponding to API pointers associated with execution of the file, a feature vector corresponding to page permission modifications associated with execution of the file, a feature vector corresponding to OS structure modifications associated with execution of the file, and/or a feature vector(s) corresponding to API vectors associated with execution of the file. In some embodiments, prediction engine 176 uses a combined feature vector in connection with determining whether a file is malicious. The combined feature vector is determined based at least in part on the set of one or more feature vectors. For example, the combined feature vector is determined based at least in part on a plurality of a page permission modification feature vector, an OS structure modification feature vector, an API pointer feature vector, and one or more API vector feature vectors. In some embodiments, prediction engine 176 determines the combined feature vector by concatenating a page permission modification feature vector, an OS structure modification feature vector, an API pointer feature vector, and/or one or more API vector feature vectors. Prediction engine 176 concatenates the set of feature vectors according to a predefined process (e.g., predefined order, etc.). In some embodiments, the predefined order in which the feature vectors are concatenated is: (1) the page permission modification feature vector, (2) the OS structure modification feature vector, (3) the API pointer feature vector, and (4) the one or more API feature vectors.

In response to determining the set of feature vectors or combined feature vector, prediction engine uses a classifier to determine whether the file is malicious (or a likelihood that the file is malicious). The classifier is used to determine whether the file is malicious based at least in part on the information pertaining to the memory artifacts. In some embodiments, the classifier is a machine learning classifier, such as a classifier that is trained using a machine learning process. Prediction uses a result of analyzing the set of feature vectors or combined feature vector with the classifier to determine whether the file is malicious.

According to various embodiments, prediction engine 176 uses the set of feature vectors obtained based on a dynamic analysis of the file to determine whether the file is malicious. In some embodiments, prediction engine 176 uses the combined feature vector in connection determining whether the file is malicious. As an example, in response to determining the corresponding feature vector(s), prediction engine 176 uses a classifier to determine whether the file is malicious (or a likelihood that the file is malicious). In some embodiments, if a result of analyzing the feature vector(s) (e.g., the combined feature vector) using the classifier is less than a predefined threshold (e.g., a predefined maliciousness threshold), the system deems (e.g., determines) that the file is not malicious (e.g., the file is benign). For example, if the result from analyzing the feature vector(s) indicates a likelihood of whether the file is malicious, then the predefined threshold can correspond to a threshold likelihood. As another example, if the result from analyzing the feature vector(s) indicates a degree of similarity of the file to a malicious file, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the file is malicious (e.g., the file is malware).

In response to receiving a file to be analyzed, malicious file detector 170 can determine whether the file corresponds to a previously analyzed file (e.g., whether the file matches a file associated with historical information for which a maliciousness determination has been previously computed). As an example, malicious file detector 170 determines whether an identifier or representative information corresponding to the file is comprised in the historical information (e.g., a blacklist, a whitelist, etc.). In some embodiments, representative information corresponding to the file is a hash or signature of the file. In some embodiments, malicious file detector 170 (e.g., prediction engine 176) determines whether information pertaining to a particular is comprised in a dataset of historical files and historical information associated with the historical dataset indicating whether a particular file is malicious (e.g., a third-party service such as VirusTotal™). In response to determining that information pertaining to a particular file is not comprised in, or available in, dataset of historical files and historical information, malicious file detector 170 may deem the file has not yet been analyzed and malicious file detector can invoke a dynamic analysis of the file in connection with determining (e.g., predicting) whether the file is malicious. An example of the historical information associated with the historical files indicating whether a particular file is malicious corresponds to a VirusTotal® (VT) score. In the case of a VT score greater than 0 for a particular file, the particular file is deemed malicious by the third-party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third-party service, a community-based score, etc.) indicates whether other vendors or cyber security organizations deem the particular file to be malicious.

In some embodiments, malicious file detector 170 (e.g., prediction engine 176) determines that a received file is newly analyzed (e.g., that the file is not within the historical information/dataset, is not on a whitelist or blacklist, etc.). Malicious file detector 170 (e.g., virtual environment module 172) may detect that a file is newly analyzed in response to security platform 140 receiving the file from a security entity (e.g., a firewall) or endpoint within a network. For example, malicious file detector 170 determines that a file is newly analyzed contemporaneous with security platform 140, or malicious file detector 170, receiving the file. As another example, malicious file detector 170 (e.g., prediction engine 176) determines that a file is newly analyzed according to a predefined schedule (e.g., daily, weekly, monthly, etc.), such as in connection with a batch process. In response to determining that a file that is received that has not yet been analyzed with respect to whether such file is malicious (e.g., the system does not comprise historical information with respect to such file), malicious file detector 170 determines whether to use a dynamic analysis of the file (e.g., to execute the file in a sandbox and analyze resulting memory artifacts) in connection with determining whether the file is malicious (e.g., such as in response to determining that the file invokes evasion techniques during a static analysis or in-guest analysis), and malicious file detector 170 uses a classifier with respect to a set of feature vectors or a combined feature vector associated with characteristics.

According to various embodiments, in response to prediction engine 176 determining that the file is malicious, the system sends to a security entity (or endpoint such as a client) an indication that the file is malicious. For example, malicious file detector 170 sends to a security entity (e.g., a firewall) or network node (e.g., a client) an indication that the file is malicious. The indication that the file is malicious may correspond to an update to a blacklist of files (e.g., corresponding to malicious files) such as in the case that the file is deemed to be malicious, or an update to a whitelist of files (e.g., corresponding to non-malicious files) such as in the case that the file is deemed to be benign. In some embodiments, malicious file detector 170 sends a hash or signature corresponding to the file in connection with the indication that the file is malicious or benign. The security entity or endpoint may compute a hash or signature for a file and perform a lookup against a mapping of hashes/signatures to indications of whether files are malicious/benign (e.g., query a whitelist and/or a blacklist). In some embodiments, the hash or signature uniquely identifies the file.

Cache 178 stores information pertaining to a file. In some embodiments, cache 178 stores mappings of indications of whether a file is malicious (or likely malicious) to particular files, or mappings of indications of whether a file is malicious (or likely malicious) to hashes or signatures corresponding to files. Cache 178 may store additional information pertaining to a set of files such as script information for files in the set of files, hashes or signatures corresponding to files in the set of files, other unique identifiers corresponding to files in the set of files, memory artifacts obtained/generated during execution of the file in a sandbox, executables called by the files, bitcoin wallets called by the files, pointers comprised in the files, etc.

Returning to FIG. 1, suppose that a malicious individual (using client device 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. DNS server 122 (e.g., an enterprise DNS server) is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32y1hkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of security platform 140 (e.g., reachable via external network 118). As an example, security platform 140 may be an enterprise network. Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers, and/or quarantining or deleting files identified as being malicious (or likely malicious). In some embodiments, data appliance 102 is also configured to enforce policies with respect to traffic that stays within security platform.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140), and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to open a file that was received, such as via an attachment to an email, instant message, or otherwise exchanged via a network, or when a client device receives such a file, DNS module 134 uses the file (or a computed hash or signature, or other unique identifier, etc.) as a query to security platform 140. This query can be performed contemporaneously with receipt of the file, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using malicious file detector 170) whether the queried file is a malicious file (or likely to be a malicious file) and provide a result back to DNS module 134 (e.g., "malicious DNS tunneling" or "non-tunneling").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (e.g., domain profiles 156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains. Decision engine 152 can analyze results from anomaly detector 146, similarity detector, etc. and determine whether the traffic is malicious (e.g., whether the traffic corresponds to malicious DNS tunneling, etc.).

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.1egitimatesite.com, xxx888222000444.otherlegitimatesite.com), they are highly unlikely to be misclassified as malicious tunneling. The following are example characteristics that can be extracted as features (e.g., into a feature vector) for a given group of domains (i.e., sharing a root domain).

In some embodiments, malicious file detector 170 provides to a security entity, such as data appliance 102, an indication whether a file is malicious. For example, in response to determining that the file is malicious, malicious file detector 170 sends an indication that the file is malicious to data appliance 102, and the data appliance may in turn enforce one or more security policies based at least in part on the indication that the file is malicious. The one or more security policies may include isolating/quarantining the file, deleting the file, alerting or prompting the user of the maliciousness of the file prior to the user opening/executing the file, etc. As another example, in response to determining that the file is malicious, malicious file detector 170 provides to the security entity an update of a mapping of files (or hashes, signatures, or other unique identifiers corresponding to files) to indications of whether a corresponding file is malicious, or an update to a blacklist for malicious files (e.g., identifying files) or a whitelist for benign files (e.g., identifying files that are not deemed malicious).

FIG. 2 is a block diagram of a system to detect a malicious file according to various embodiments. According to various embodiments, system 200 is implemented in connection with system 100 of FIG. 1, such as for malicious file detector 170. In various embodiments, system 200 is implemented in connection with process 500 of FIG. 5, process 600 of FIG. 6, process 700 of FIG. 7A, process 750 of FIG. 7B, process 800 of FIG. 8, process 900 of FIG. 9, process 1000 of FIG. 10, and/or process 1100 of FIG. 11. System 200 may be implemented in one or more servers, a security entity such as a firewall, and/or an endpoint.

System 200 can be implemented by one or more devices such as servers. System 200 can be implemented at various locations on a network. In some embodiments, system 200 implements malicious file detector 170 of system 100 of FIG. 1. As an example, system 200 is deployed as a service, such as a web service (e.g., system 200 determines whether a file is malicious, and provides such determinations as a service). The service may be provided by one or more servers (e.g., system 200 or the malicious file detector is deployed on a remote server that monitors or receives files that are transmitted within or into/out of a network such as via attachments to emails, instant messages, etc., and determines whether a file is malicious, and sends/pushes out notifications or updates pertaining to the file such as an indication whether a file is malicious). As another example, the malicious file detector is deployed on a firewall.

According to various embodiments, in response to receiving the file to be analyzed to determine whether the file is malicious, system 200 places the file in a sandbox in which the file is to be analyzed, and executes the file within the sandbox. System 200 monitors the execution of the file and determines whether the file is malicious based on such execution. For example, system 200 invokes a sandbox for analysis of a particular file. As another example, system 200 uses a common sandbox for analysis of various files.

In the example shown, system 200 implements one or more modules in connection with predicting whether a file (e.g., a newly received file) is malicious, determining a likelihood that the file is malicious, and/or providing a notice or indication of whether a file is malicious. System 200 comprises communication interface 205, one or more processors 210, storage 215, and/or memory 220. One or more processors 210 comprises one or more of communication module 225, virtual environment module 227, dynamic analysis module 229, feature vector determining module 231, model training module 233, prediction module 235, notification module, 237, and security enforcement module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated. As another example, communication interface 205 provides to communication module 225 information received by system 200. Communication module 225 is configured to receive files to be analyzed, such as from network endpoints or nodes such as security entities (e.g., firewalls), etc. Communication module 225 is configured to query third party service(s) for information pertaining to files (e.g., services that expose information for files such as a third-party score or assessments of maliciousness of files, a community-based score, assessment, or reputation pertaining to files, a blacklist for files, and/or a whitelist for files, etc.). For example, system 200 uses communication module 225 to query the third-party service (s). Communication module 225 is configured to receive one or more settings or configurations from an administrator. Examples of the one or more settings or configurations include configurations of a process determining whether a file is malicious, a format or process according to which a combined feature vector is to be determined, a set of feature vectors to be provided to a classifier for determining whether the file is malicious, information pertaining to a whitelist of files (e.g., files that are not deemed suspicious and for which traffic or attachments are permitted), information pertaining to a blacklist of files (e.g., files that are deemed suspicious and for which traffic or attachments are to be restricted).

In some embodiments, system 200 comprises virtual environment module 227. System 200 uses virtual environment module 227 to isolate a file being analyzed, such as during execution of the file. Virtual environment module 227 can correspond to a sandbox in which the file is executed in connection with performing a dynamic analysis of the file.

Virtual environment module 227 stores information pertaining to execution of the file within the sandbox. For example, execution traces corresponding to the execution of the file are stored. Virtual environment module 227 can be instrumented, as applicable, such that behaviors observed while the file/application is executing are logged and/or monitored (e.g., intercepting/hooking system call/API events).

In some embodiments, system 200 comprises dynamic analysis module 229. System 200 uses dynamic analysis module 229 to perform a dynamic analysis of a file. Dynamic analysis determining memory artifacts generated during execution of the file being analyzed. The dynamic analysis can include iteratively performing snapshots of the memory structure associated with the virtual environment, and comparing the collected snapshots to determine characteristics that were invoked and/or changed during execution of the file (e.g., page permission modifications, OS structure modifications, API pointers, and/or API vectors). As an example, determining the memory artifacts includes monitoring changes in memory (of the virtual environment) such as after a system call event during execution of a malware sample in the computing environment is performed. For example, each time one of the functions/ selected system APIs is called, the call stack can be inspected to determine whether any return address in the call stack points to a memory address that has changed since the first/previous image of memory was performed, and if so, another snapshot can be performed which can be utilized to identify a subset of the pages in memory that have changed since the first/previous image of memory. The techniques of snapshotting in memory based upon system call events can efficiently and effectively facilitate automatic detection of unpacking of code in memory during execution of the malware sample in the computing environment.

In some embodiments, system 200 comprises feature vector determining module 231. System 200 uses feature vector determining module 231 to determine a set of feature vectors or a combined feature vector to use in connection with determining whether a file is malicious. The set of feature vectors or a combined feature vector can correspond to a characterization of different aspects of the execution of the file such as a behavior of the file during execution. For example, feature vector determining module 231 determines feature vectors for (e.g., characterizing) the one or more of (i) API pointers, (ii) API vectors, (iii) page permission modifications, and/or (iv) OS structure modifications. Feature vector determining module 231 can determine a feature vector corresponding to API pointers associated with execution of the file, a feature vector corresponding to page permission modifications associated with execution of the file, a feature vector corresponding to OS structure modifications associated with execution of the file, and/or a feature vector(s) corresponding to API vectors associated with execution of the file. In some embodiments, feature vector determining module 231 uses a combined feature vector in connection with determining whether a file is malicious. The combined feature vector is determined based at least in part on the set of one or more feature vectors. For example, the combined feature vector is determined based at least in part on a plurality of a page permission modification feature vector, an OS structure modification feature vector, an API pointer feature vector, and one or more API vector feature vectors. In some embodiments, feature vector determining module 231 determines the combined feature vector by concatenating a page permission modification feature vector, an OS structure modification feature vector, an API pointer feature vector, and/or one or more API vector feature vectors. Feature vector determining module 231 concatenates the set of feature vectors according to a predefined process (e.g., predefined order, etc.). In some embodiments, the predefined order in which the feature vectors are concatenated is: (1) the page permission modification feature vector, (2) the OS structure modification feature vector, (3) the API pointer feature vector, and (4) the one or more API feature vectors.

In some embodiments, system 200 comprises model training module 233. System 200 uses model training module 233 to determine a model for determining whether a file is malicious, or relationships (e.g., features) between characteristics of the file (or behavior of the file during execution) and maliciousness of the file. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, model training module 233 trains an XGBoost machine learning classifier model. Inputs to the classifier (e.g., the XGBoost machine learning classifier model) is a combined feature vector or set of feature vectors, and based on the combined feature vector or set of feature vectors the classifier model determines whether the corresponding file is malicious, or a likelihood that the file is malicious.

In some embodiments, system 200 comprises prediction module 235. System 200 uses prediction module 235 to determine (e.g., predict) whether a file is malicious or likelihood that the file is malicious. Prediction module 235 uses a model such as a machine learning model trained by model training module 233 in connection with determining whether a file is malicious or likelihood that the file is malicious. For example, prediction module 235 uses the XGBoost machine learning classifier model to analyze the combined feature vector to determine whether the file is malicious. Accordingly, prediction module 235 determines whether a file is malicious (or a likelihood that the file is malicious) based on a dynamic analysis of the file, such as an analysis of the memory structure such as changes in the memory structure during execution of the file.

In some embodiments, prediction module 235 determines whether information pertaining to a particular file (e.g., a hash or other signature corresponding to a file being analyzed) is comprised in a dataset of historical files and historical information associated with the historical dataset indicating whether a particular file is malicious (e.g., a third-party service such as VirusTotal™). In response to determining that information pertaining to a particular file is not comprised in, or available in, dataset of historical files and historical information, prediction module 235 may deem the file to be benign (e.g., deem the file to not be malicious). An example of the historical information associated with the historical files indicating whether a particular file is malicious corresponds to a VirusTotal® (VT) score. In the case of a VT score greater than 0 for a particular file, the particular file is deemed malicious by the third-party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third-party service, a community-based score, etc.) indicates whether other vendors or cyber security organizations deem the particular file to be malicious.

System 200 may determine (e.g., compute) a hash or signature corresponding to the file and perform a lookup against the historical information (e.g., a whitelist, a blacklist, etc.). In some implementations, prediction module 235 corresponds to, or is similar to, prediction engine 176. System 200 (e.g., prediction module 235) may query, via communication interface 205, a third party (e.g., a third-party service) for historical information pertaining to files (or a set of files or hashes/signatures for files previously deemed to be malicious or benign). System 200 (e.g., prediction module 235) may query the third party at predetermined intervals (e.g., customer-specified intervals, etc.). As an example, prediction module 235 may query the third party for information for newly analyzed files daily (or daily during the business week).

In some embodiments, system 200 comprises notification module 237. System 200 uses notification module 237 to provide an indication that the file is malicious. For example, notification module 250 obtains an indication of whether the file is malicious (or a likelihood that the file is malicious) from prediction module 235 and provides the indication of whether the file is malicious to one or more security entities and/or one or more endpoints. As another example, notification module 237 provides to one or more security entities (e.g., a firewall), nodes, or endpoints (e.g., a client terminal) an update to a whitelist of files and/or blacklist of files. According to various embodiments, notification module 237 obtains a hash, signature, or other unique identifier associated with the file, and provides the indication of whether the file is malicious in connection with the hash, signature, or other unique identifier associated with the file.

According to various embodiments, the hash of a file corresponds to a hash using a predetermined hashing function (e.g., an MD5 hashing function, etc.). A security entity or an endpoint may compute a hash of a received file (e.g., a file attachment, etc.). The security entity or an endpoint may determine whether the computed hash corresponding to the file is comprised within a set such as a whitelist of benign files, and/or a blacklist of malicious files, etc. If a signature for malware (e.g., the hash of the received file) is included in the set of signatures for malicious files (e.g., a blacklist of malicious files), security entity or an endpoint can prevent the transmission of malware to an endpoint (e.g., a client device) and/or prevent an opening or execution of the malware accordingly.

In some embodiments, system 200 comprises security enforcement module 239. System 200 uses security enforcement module 239 enforces one or more security policies with respect to information such as network traffic, files, etc. Security enforcement module 239 enforces the one or more security policies based on whether the file is determined to be malicious. As an example, in the case of system 200 being a security entity (e.g., a firewall) or firewall, system 200 comprises security enforcement module 239. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

According to various embodiments, storage 215 comprises one or more of filesystem data 260, execution data 262, and/or model data 264. Storage 215 comprises a shared storage (e.g., a network storage system) and/or database data, and/or user activity data.

In some embodiments, filesystem data 260 comprises a database such as one or more datasets (e.g., one or more datasets for files and/or file attributes, mappings of indicators of maliciousness to files or hashes, signatures or other unique identifiers of files, mappings of indicators of benign files to files or hashes, signature or other unique identifiers of files, etc.). Filesystem data 260 comprises data such as historical information pertaining files (e.g., maliciousness of files), a whitelist of files deemed to be safe (e.g., not suspicious), a blacklist of files deemed to be suspicious or malicious (e.g., files for which a deemed likelihood of maliciousness exceeds a predetermined/preset likelihood threshold), information associated with suspicious or malicious files, etc.

Execution data 262 comprises information pertaining to the execution of a file within a sandbox such as virtual environment module 227. In some embodiments, the information pertaining to the execution of a file includes data that is indicative of a behavior of the file during execution. The information pertaining to the execution of the file corresponds to one or more snapshots of a memory (e.g., a memory structure) for the sandbox. Data corresponding to page permission modifications, OS structure modifications, API pointers, and/or API vectors can be determined based at least in part on the one or more snapshots. In some embodiments, execution data 262 comprises hashes or signatures for files such as files that are analyzed by system 200 to determine whether such files are malicious, or a historical dataset that have been previously assessed for maliciousness such as by a third party. Execution data 262 can include a mapping of hash values to indications of maliciousness (e.g., an indication that the corresponding is malicious or benign, etc.).

Model data 264 comprises information pertaining to one or more models used to determine whether a file is malicious or a likelihood that a file is malicious. As an example, model data 264 stores the classifier (e.g., the XGBoost machine learning classifier model) used in connection with a set of feature vectors or a combined feature vector. Model data 264 comprises a feature vector may be generated with respect to each of the one or more of (i) API pointers, (ii) API vectors, (iii) page permission modifications, and/or (iv) OS structure modifications. In some embodiments, model data 265 comprises a combined feature vector that is generated based at least in part on the respective feature vectors for the one or more of (i) API pointers, (ii) API vectors, (iii) page permission modifications, and/or (iv) operating system (OS) structure modifications. The combined feature vector may be a concatenation of the respective feature vectors for the one or more of (i) API pointers, (ii) API vectors, (iii) page permission modifications, and/or (iv) OS structure modifications.

According to various embodiments, memory 220 comprises executing application data 270. Executing application data 270 comprises data obtained or used in connection with executing an application such as an application executing a hashing function, an application to extract information from a file, or an application to analyze execution of a file within a sandbox. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious files, a document preparation application, a report preparation application, a user interface application, a data analysis application, an anomaly detection application, a user authentication application, a security policy management/update application, etc.).

FIG. 3A is an illustration of an API pointer corresponding to an example file. Data 300 corresponds to information pertaining to execution of a file within a sandbox (e.g., information obtained from a snapshot of the memory structure, etc.). As illustrated in the example, data 300 includes an API pointer (e.g., an indication of an API to be invoked, and a location of the API). The API pointers correspond to pointers to APIs in memory, and indicate the set or types of APIs that the corresponding file is intending to use. For API pointers, features are tokens creating by merging normalized API pointers and memory type, which in the case of data 300 corresponds to <wow65.dll-wow64aperoutine>.<stack>.

Figure 3B:
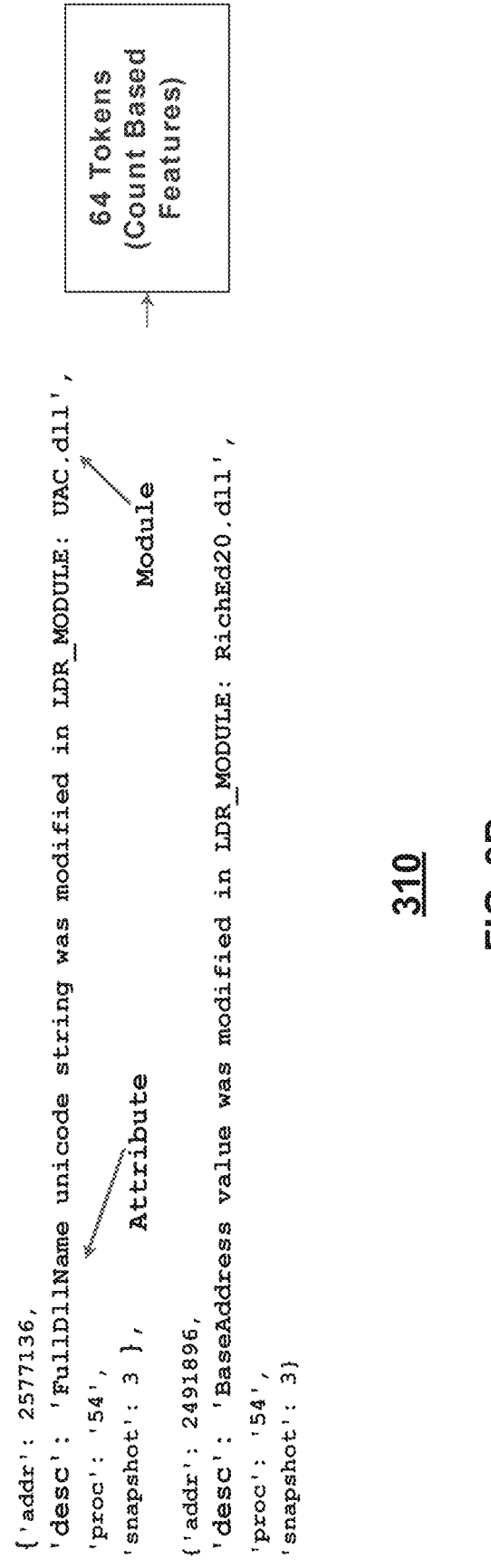
FIG. 3B is an illustration of an operating system (OS) structure modification of an example file.

FIG. 3B is an illustration of an operating system (OS) structure modification of an example file. Data 310 corresponds to information pertaining to execution of a file within a sandbox (e.g., information obtained from a snapshot of the memory structure, etc.). As illustrated in the example, data 310 includes an OS structure modification. The OS structure modifications can indicate if the file (e.g., the malware) is attempting to hide its presence by modifying the loaded process module list. Because malware occasionally modifies windows process structures to hide itself (e.g., to evade detection), information pertaining to operating system (OS) structure modification can be used in the identification of malware (or to identify a file that appears similar to malware).

FIG. 3C is an illustration of a page permission modification of an example file. Data 320 corresponds to information pertaining to execution of a file within a sandbox (e.g., information obtained from a snapshot of the memory structure, etc.). As illustrated in the example, data 320 includes a page permission modification. The modification of page permissions is generally used in packed malware and malware that tends to extract and execute a payload. For page permission modifications, features are tokens creating by merging permissions and memory location. Examples of features for a page permission modification can include <hw:W>.<executable>; <hw:W>.<stack>, <hw:W>.<heap>, <hw:W>.<launcher>, and/or <hw:W>.<process>.

FIG. 3D is an illustration of an API vector corresponding to an example file. Data 330 corresponds to information pertaining to execution of a file within a sandbox (e.g., information obtained from a snapshot of the memory structure, etc.). As illustrated in the example, data 330 includes API vector hash values. The API vectors can correspond to contiguous lists of API pointers in memory, or a list of API pointers within a defined proximity of each other. For API vectors, features are tokens creating Ngrams (2, 3, 4) and skipgrams (1,2,3) of API pointers per API vector.

Figure 3E:
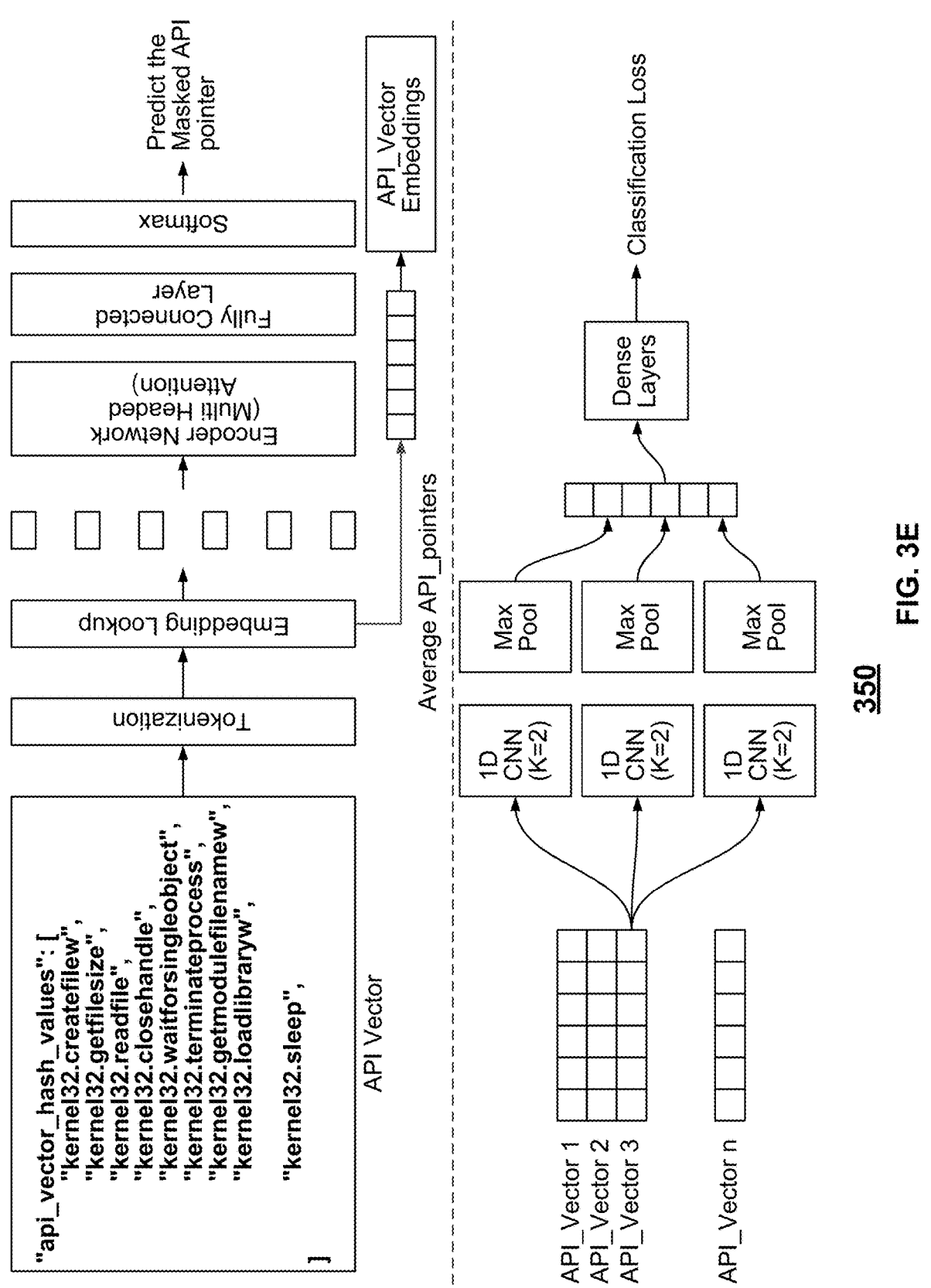
FIG. 3E is an illustration of classification of a file using information pertaining to API vectors invoked in the example file.

FIG. 3E is an illustration of classification of a file using information pertaining to API vectors invoked in the example file. In the example illustrated, feature vector classification 350 based on API feature vectors is provided.

Determining features corresponding to API vectors is significantly more difficult than the determining of the features for OS structure modifications, page permission changes, and API pointers. The difficulty in determining the features corresponding to API vectors arises because each malware or benign sample generates a variable number of API vectors (e.g., during execution), and/or each API vector is itself a variable length. Various embodiments implement different mechanisms for determining features for the features for the API vectors. For example, in a first implementation, n grams and skipgrams are extracted from API vectors, and explainable features are obtained. As another example, in a second implementation, representation learning is performed with respect to the API pointers.

As illustrated in FIG. 3E, a set of API vectors associated with execution of a file in a sandbox is obtained. In response to obtaining the set of API vectors, the API vectors are encoded to an integer id such as: encoding API vectors ["kernel32.createfilew", "kernel32.getfilesize", "kernel32.readfile", "kernel32.closehandle", . . . ] to [2,6,3, 9,14, . . . ].

According to various embodiments, for each of the API vector the corresponding API pointer is masked and a bi-directional transformer encoder is used to encode the contextual information of API vectors. The bi-directional transformer encoder uses a multi-head attention to encode the contextual information of API vectors by treating the contextual information as a sentence. After such a deep learning model is trained, the embedding for each API pointer is extracted and averaged to obtain an API vector embedding.

In some embodiments, the obtained API vectors are used to perform supervised classification using a 1D convolution neural network with a varying number of filters (2,3,4). Then the final layers are utilized output as a feature vector. In some embodiments, the feature vector has better representation capability compared to the n grams but loses the explainability capability as the feature vector cannot be mapped back to a single API pointer.

According to various embodiments, a custom feature that was extracted is the <api_pointers>_<memory_location> tuple sorted by the memory space. Although API Vectors capture the contiguous API Pointers, by doing this we also capture the order of non-contiguous API Pointers. Ngram is then performed, and a deep learning model is used to extract a feature vector.

Related art solutions that use an out of guest hypervisor sandbox as source of execution logs do not use page permissions, OS structure modifications or API vectors to detect malicious files. API pointers used by related art solutions are extracted from the import table from the file structure, and are not dynamically resolved. Various embodiments disclosed herein uses the dynamically resolved API pointers extracted from the memory.

Figure 3F:
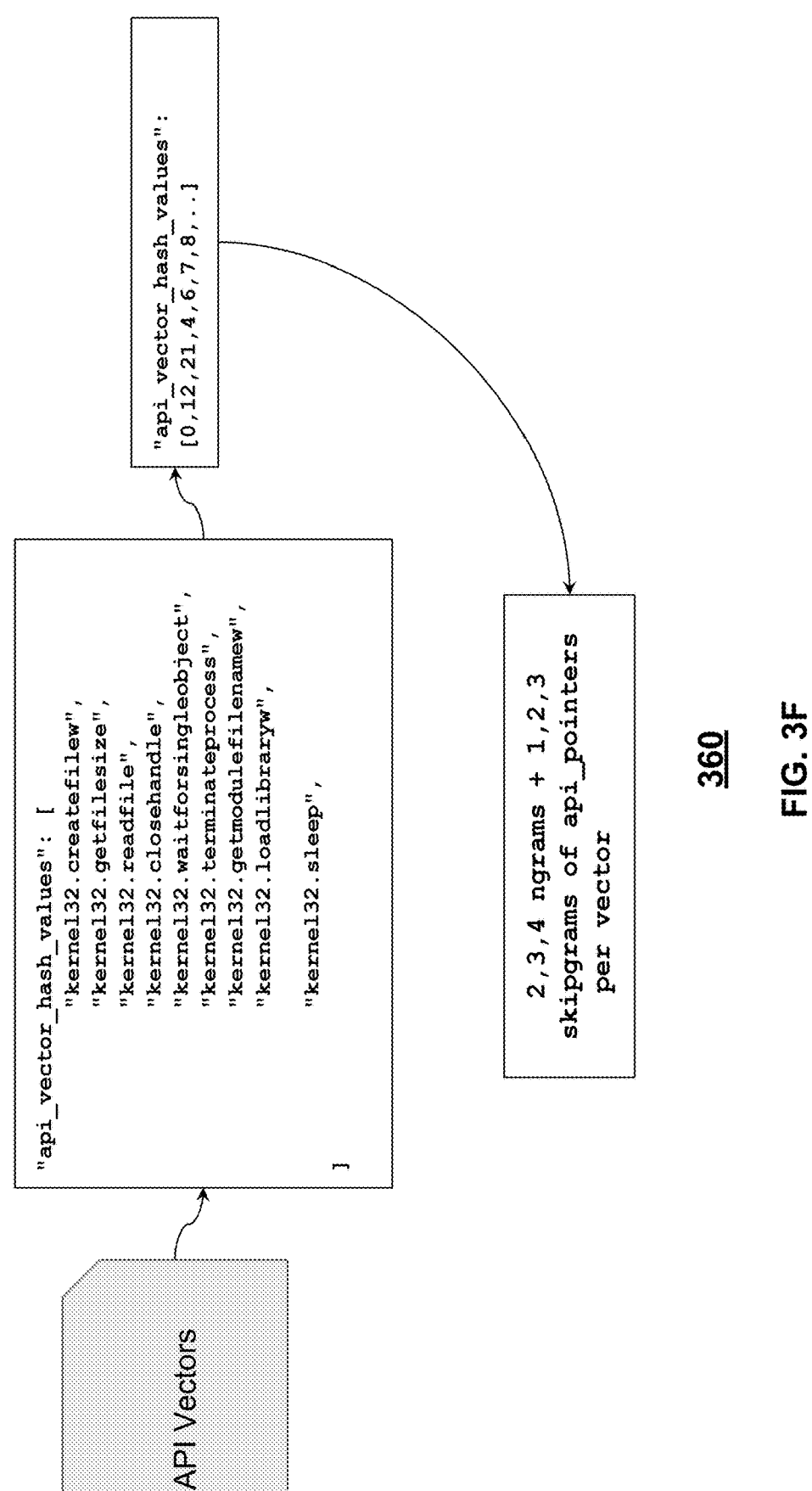
FIG. 3F is an illustration of classification of a file using information pertaining to API vectors invoked in the example file.

FIG. 3F is an illustration of classification of a file using information pertaining to API vectors invoked in the example file. In the example illustrated in FIG. 3F, process 360 includes obtaining a set of API vectors, determining a set of tokens for the set of API vectors, and a set of hash values for the API vectors. In some embodiments, the system obtains 2, 3, and/or ngrams and 1, 2, and/or 3 skipgrams with respect to the set of API vectors.

Figure 4:
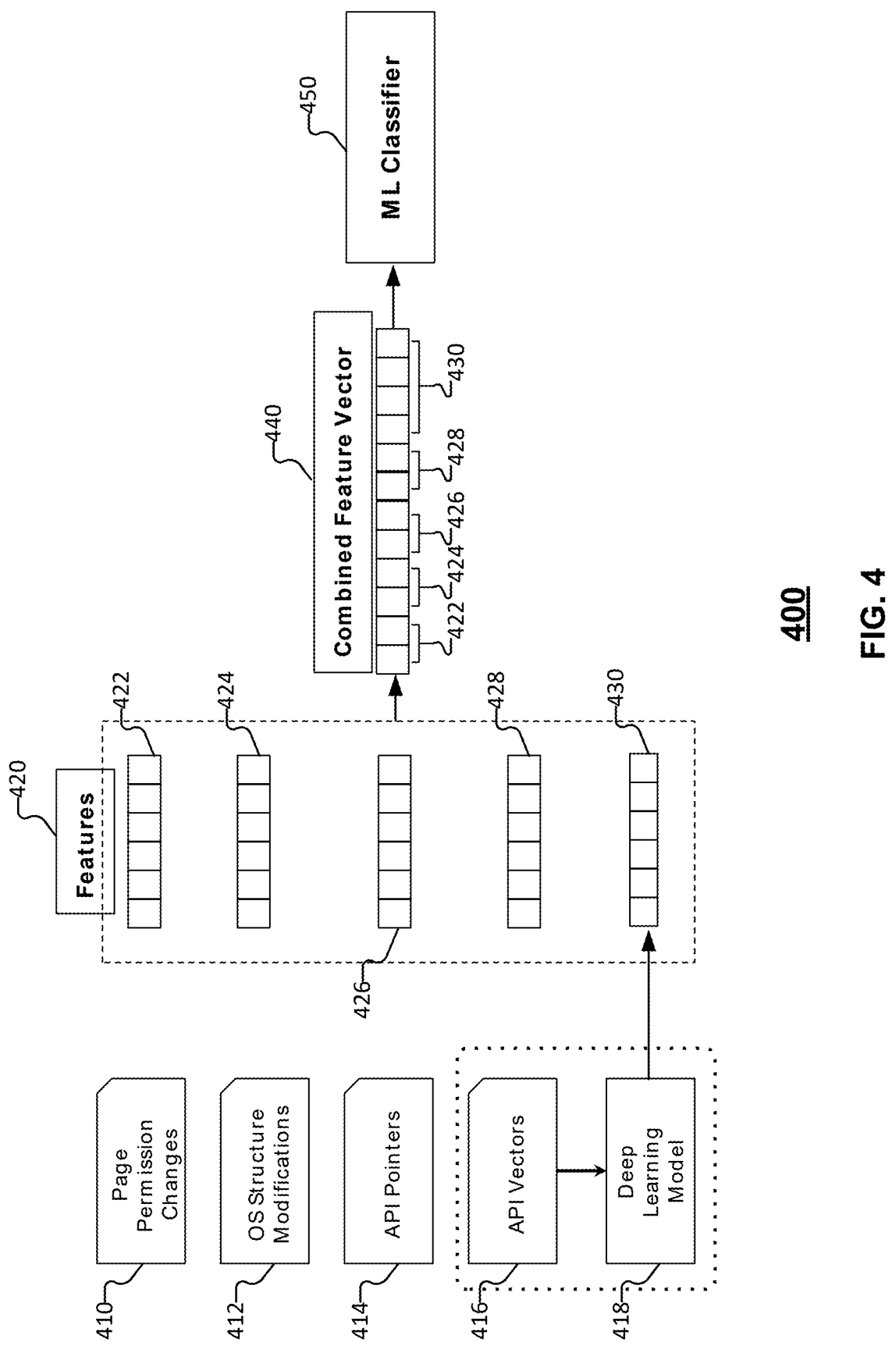
FIG. 4 is an illustration of a combined feature vector according to various embodiments.

FIG. 4 is an illustration of a combined feature vector according to various embodiments. In various embodiments, a machine learning system is implemented to determine custom features and extracted from memory artifacts associated with execution of files in a sandbox. The memory artifacts are obtained based on a dynamic analysis of the file.

In the example shown, the classification process includes obtaining information pertaining to execution of the file, including one or more of page permission modifications 410, OS structure modifications 412, API pointers 414, and API vectors 416. In some embodiments, API vectors corresponding to execution of the file are input to a deep learning model.

In response to obtaining information pertaining to execution of the file, the system obtains one or more feature vectors 420. A feature vector can be used as an input to a predictor function (e.g., a linear predictor function) to obtain a binary classification. A feature vector is an n-dimensional vector of numerical features that represent an object. Machine learning processes typically use a numerical representation of objects to process and/or perform a statistical analysis. The one or more feature vectors 420 may comprise a page permission modification feature vector 422, an OS structure modification feature vector 424, an API pointer feature vector 426, an API vector feature vector 428, and/or a feature vector 430 determined based on applying a deep learning model to the API vectors.

In response to determining the one or more feature vectors 420, the system determines a combined feature vector 440. The combined feature vector 440 is determined based at least in part on the one or more feature vectors 420. In some embodiments, combined feature vector 440 is based at least in part on one or more of an API vector feature vector 428, and/or a feature vector 430 determined based on applying a deep learning model to the API vectors. In some embodiments, combined feature vector 440 is determined based on page permission modification feature vector 422, OS structure modification feature vector 424, API pointer feature vector 426, API vector feature vector 428, and feature vector 430 determined based on applying a deep learning model to the API vectors, or any combination thereof. In the example illustrated in FIG. 4, combined feature vector is a concatenation of page permission modification feature vector 422, OS structure modification feature vector 424, API pointer feature vector 426, API vector feature vector 428, and feature vector 430 determined based on applying a deep learning model to the API vectors. The concatenation can be performed based on a predetermined order or process.

In response to obtaining combined feature vector 440, the system uses combined feature vector 440 as an input to a classifier 450 (e.g., a machine learning classifier). The system uses an output of classifier 450 as a prediction or determination of whether the corresponding file is malicious.

In various embodiments, a plurality of features is determined in connection with using OS structure modification to determine whether a file is malicious. The plurality of features can be represented in OS structure modification feature vector 424. For example, the system may implement at least 10 features corresponding to OS structure modification. As another example, the system may implement at least 25 features corresponding to OS structure modification. As another example, the system may implement at least 50 features corresponding to OS structure modification. As another the system may implement about 64 features corresponding to OS structure modification. Each feature corresponding to OS structure modification can represent a count of a word or token that represents the module and/or the attribute modified.

In various embodiments, a plurality of features is determined in connection with using page permission modifications to determine whether a file is malicious. The plurality of features can be represented in page permission modifications feature vector 422. For example, the system may implement at least 5 features corresponding to page permission modifications. As another example, the system may implement at least 10 features corresponding to page permission modifications. As another example, the system may implement at least 20 features corresponding to page permission changes. As another the system may implement about 25 features corresponding to page permission modifications. Each feature corresponding to page permission modifications can represent the count of "<permission>.<location>" tuple.

In various embodiments, a plurality of features is determined in connection with using API pointers to determine whether a file is malicious. The plurality of features can be represented in API pointers feature vector 426. For example, the system may implement at least 100 features corresponding to API pointers. As another example, the system may implement at least 200 features corresponding to API pointers. As another example, the system may implement at least 250 features corresponding to API pointers. As another the system may implement about 256 features corresponding to corresponding to API pointers. Each feature corresponding to API pointers can represent the count of "<module-API>.<memory location>" tuple.

Determining features corresponding to API vectors is significantly more difficult than the determining of the features for OS structure modifications, page permission changes, and API pointers. The difficulty in determining the features corresponding to API vectors arises because each malware or benign sample generates a variable number of API vectors (e.g., during execution), and/or each API vector is itself a variable length. Various embodiments implement different mechanisms for determining features for the features for the API vectors. For example, in a first implementation, n grams and skipgrams are extracted from API vectors, and explainable features are obtained. As another example, in a second implementation, representation learning is performed with respect to the API pointers.

Figure 5:
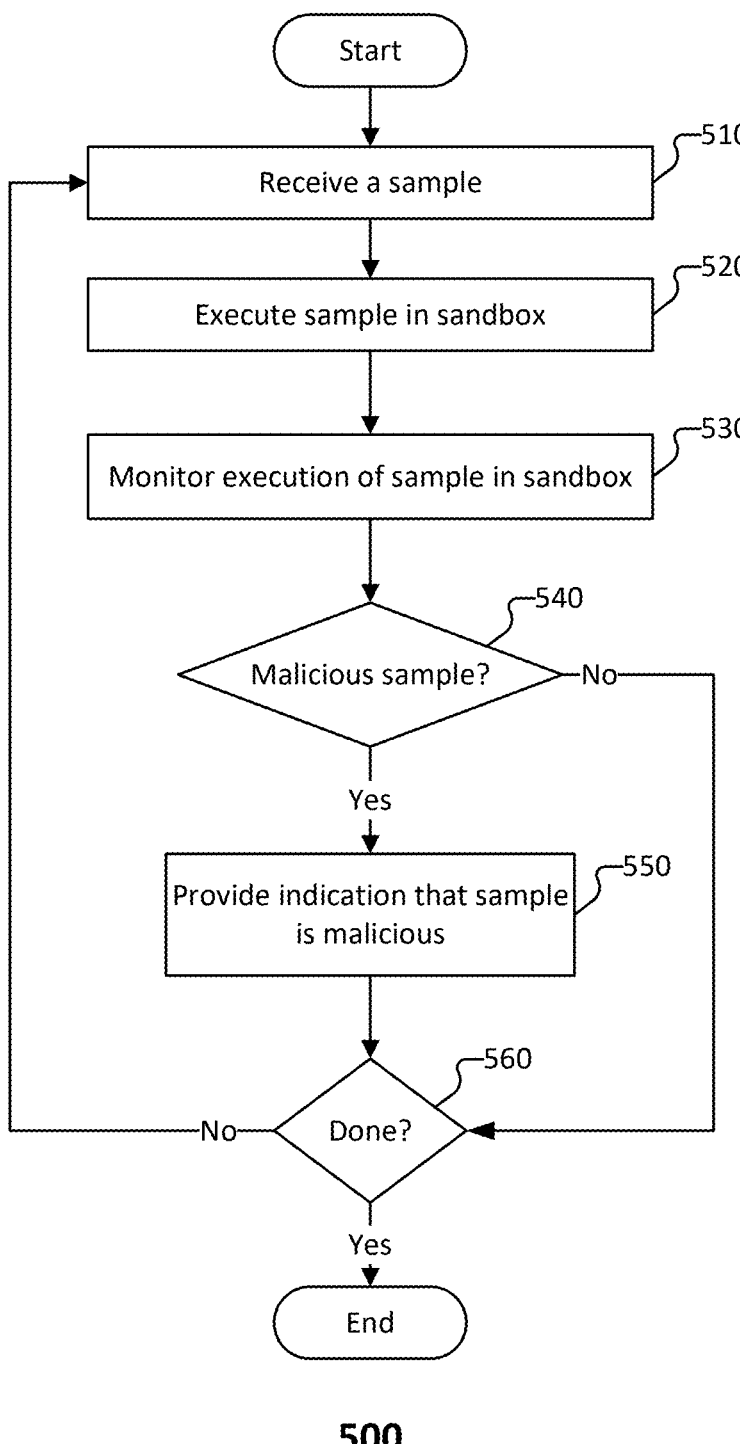
FIG. 5 is a flow diagram of a method for determining whether a file is malicious a malicious file according to various embodiments.

FIG. 5 is a flow diagram of a method for determining whether a file is malicious a malicious file according to various embodiments. In some embodiments, process 500 is implemented at least in part on by system 100 of FIG. 1 and/or system 200 of FIG. 2. In some implementations, process 500 may be implemented by one or more servers, such as in connection with providing a service to a network (e.g., a security entity and/or a network endpoint such as a client device). In some implementations, process 500 may be implemented by a security entity (e.g., a firewall) such as in connection with enforcing a security policy with respect to files communicated across a network or in/out of the network. In some implementations, process 500 may be implemented by a client device such as a laptop, a smartphone, a personal computer, etc., such as in connection with executing or opening a file such as an email attachment.

At 510, a sample is received. In some embodiments, the system receives the sample from a security entity, an endpoint, or other system in connection with a request for the system to assess whether the file is malicious. The system may receive the file in response to a determination that the file is not included on a blacklist or whitelist of files previously assessed for maliciousness.

At 520, the sample is executed in in a sandbox. In some embodiments, the system executes the sample in the sandbox in order to isolate the file, or execution of the file, from other system components. The system may instantiate the sandbox in connection with the request for the system to determine whether the file is malicious, or the sandbox can pre-instantiated.

At 530, the execution of the sample in the sandbox is monitored. In some embodiments, the system performs a dynamic analysis of the file. For example, the system obtains (e.g., determines) memory artifacts associated with the execution of the sample. In some embodiments, the system iteratively performs a snapshotting of at least part of the memory structure (e.g., a memory structure associated with the sandbox). The monitoring the execution of the sample in the sandbox can include monitoring changes in memory after a system call event during execution of the sample in the sandbox. The system may perform a snapshotting of at least part of the memory in response to the monitoring of the execution of the sample. For example, the system performs a snapshotting of the memory structure each time a function/selected system APIs is called. The call stack can be inspected to determine whether any return address in the call stack points to a memory address that has changed since the first/previous image of memory was performed, and if so, another snapshot can be performed which can be utilized to identify a subset of the pages in memory that have changed since the first/previous image of memory.

In various embodiments, in connection with the monitoring of the execution of the sample, the system obtains information pertaining to one or more of (i) API pointers, (ii) API vectors, (iii) page permission modifications, and/or (iv) OS structure modifications.

At 540, a determination of whether the sample is malicious is performed. In some embodiments, the system determines whether the sample is malicious based at least in part on the monitoring of the execution of the sample in the sandbox.

In response to determining that the sample is malicious at 540, process 500 proceeds to 550 at which a maliciousness result is provided. In some embodiments, the system provides an indication that sample corresponds to a malicious file, such as to an endpoint, security entity, or other system that provided the sample or requested that the system assess the maliciousness of the sample. For example, the system updates a blacklist or other mapping of files to malicious files to include the sample (e.g., a unique identifier associated with the sample such as a hash, a signature, etc.).

In response to determining that the sample is not malicious at 540, process 500 proceeds to 560.

At 560, a determination is made as to whether process 500 is complete. In some embodiments, process 500 is determined to be complete in response to a determination that no further samples are to be analyzed (e.g., no further predictions for files are needed), an administrator indicates that process 500 is to be paused or stopped, etc. In response to a determination that process 500 is complete, process 500 ends. In response to a determination that process 500 is not complete, process 500 returns to 510.

Figure 6:
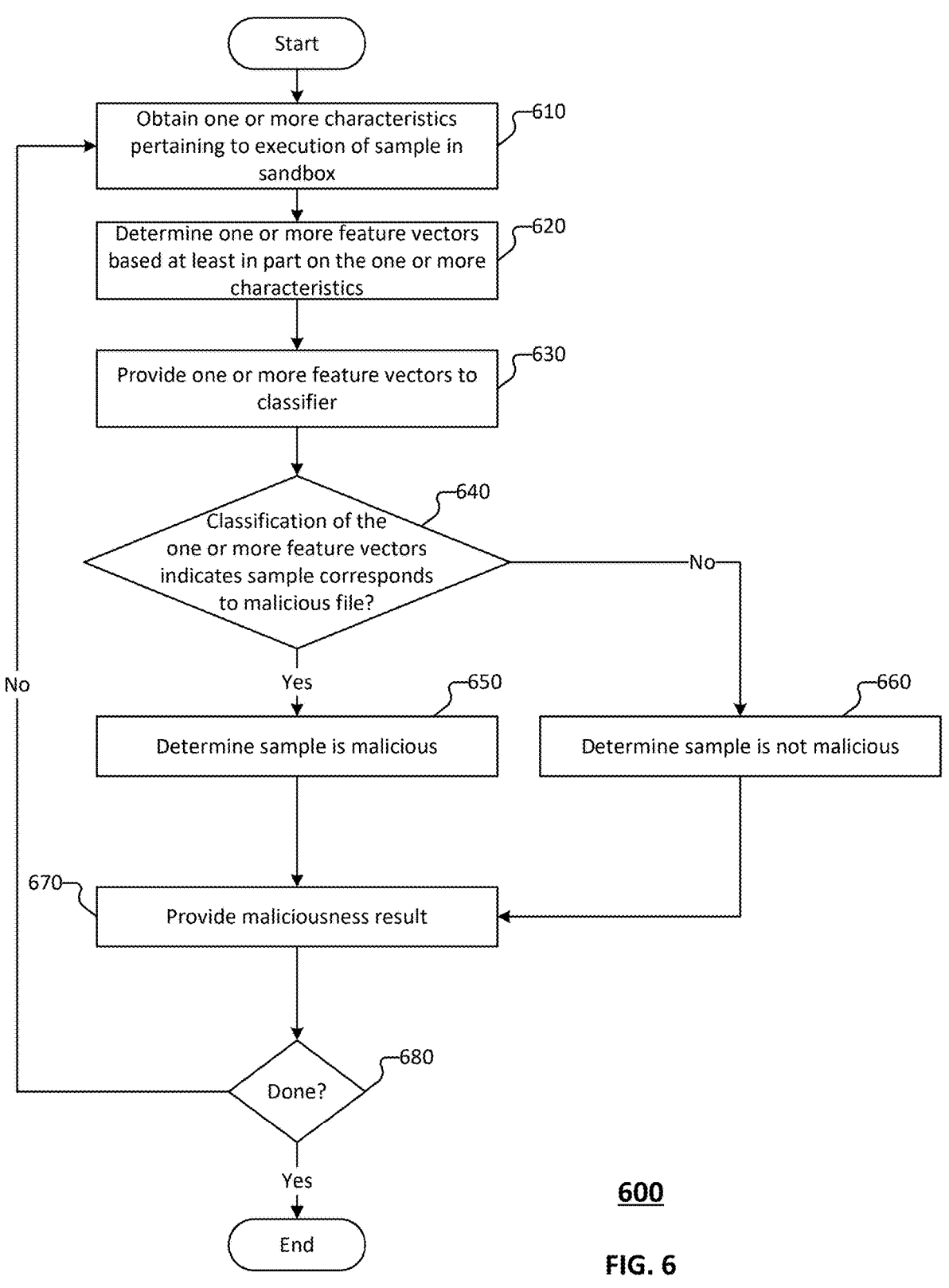
FIG. 6 is a flow diagram of a method for determining whether a file is malicious according to various embodiments.

FIG. 6 is a flow diagram of a method for determining whether a file is malicious according to various embodiments. In some embodiments, process 600 is implemented at least in part on by system 100 of FIG. 1 and/or system 200 of FIG. 2. In some implementations, process 600 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to files communicated across a network or in/out of the network. In some implementations, process 600 may be implemented by a client device such as a laptop, a smartphone, a personal computer, etc., such as in connection with executing or opening a file such as an email attachment.

At 610, one or more characteristics pertaining to execution of a sample in a sandbox are obtained.

At 620, one or more feature vectors are determined based at least in part on the one or more characteristics. In some embodiments, the determining the one or more feature vectors includes invoking process 700 of FIG. 7A or process 750 of FIG. 7B.

The one or more feature vectors can include one or more of feature vectors for (e.g., characterizing) the one or more of (i) API pointers, (ii) API vectors, (iii) page permission modifications, and/or (iv) OS structure modifications. In some embodiments, the one or more feature vectors include a combined feature vector. The combined feature vector is determined based at least in part on a set of one or more feature vectors, including at least one of feature vectors for (e.g., characterizing) the one or more of (i) API pointers, (ii) API vectors, (iii) page permission modifications, and/or (iv) OS structure modifications. In some embodiments, the combined feature vector is based at least in part on a feature vector(s) corresponding to the API vectors. As example, the combined feature vector is determined based at least in part on a plurality of a page permission modification feature vector, an OS structure modification feature vector, an API pointer feature vector, and one or more API vector feature vectors. In some embodiments, the combined feature vector is obtained concatenating a page permission modification feature vector, an OS structure modification feature vector, an API pointer feature vector, and/or one or more API vector feature vectors. As an example, the set of feature vectors are concatenated according to a predefined process (e.g., predefined order, etc.). In some embodiments, the predefined order in which the feature vectors are concatenated is: (1) the page permission modification feature vector, (2) the OS structure modification feature vector, (3) the API pointer feature vector, and (4) the one or more API feature vectors.

At 630, the one or more feature vectors is provided to a classifier. In some embodiments, the classifier is a machine learning classifier that is trained using a machine learning process. For example, the classifier corresponds to XGBoost machine learning classifier model. The system uses a model, such as a machine learning model trained by a machine learning process, in connection with determining whether the sample is malicious or a likelihood that the file is malicious. For example, the system uses the XGBoost machine learning classifier model to analyze the one or more feature vectors (e.g., the combined feature vector) to determine whether the file is malicious.

At 640, a determination is performed as to whether classification of the one or more feature vectors indicates that a sample corresponds to a malicious file. In some embodiments, if a result of analyzing the feature vector(s) (e.g., the combined feature vector) using the classifier is less than a predefined threshold (e.g., a predefined maliciousness threshold), the system deems (e.g., determines) that the file is not malicious (e.g., the file is benign). For example, if the result from analyzing the feature vector(s) indicates a likelihood of whether the file is malicious, then the predefined threshold can correspond to a threshold likelihood. As another example, if the result from analyzing the feature vector(s) indicates a degree of similarity of the file to a malicious file, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the file is malicious (e.g., the file is malware).

In response to a determination that the classification of the one or more feature vectors indicates that the sample corresponds to a malicious file at 640, process 600 proceeds to 650 at which the sample is determined to be malicious.

In response to a determination that the classification of the one or more feature vectors indicates that the sample does not correspond to a malicious file at 640, process 600 proceeds to 660 at which the sample is determined to be not malicious. In some embodiments, the system determines that the sample is benign in response to a determination that the classifier indicates that the sample is not malicious, or that a likelihood that the sample is malicious is less than a predefined maliciousness threshold.

At 670, a maliciousness result is provided. In some embodiments, the system provides an indication of whether the sample corresponds to a malicious file. For example, the system provides an update to a blacklist or other mapping of files to malicious files to include the sample (e.g., a unique identifier associated with the sample such as a hash, a signature, etc.). The system may further provide the corresponding updated blacklist or other mapping to an endpoint, a security entity, etc. For example, the system pushes an update to the blacklist or other mapping of files to malicious files to other devices that enforce one or more security policies with respect to traffic or files, or that are subscribed to a service of the system.

At 680, a determination is made as to whether process 600 is complete. In some embodiments, process 600 is determined to be complete in response to a determination that no further samples are to be analyzed (e.g., no further predictions for files are needed), an administrator indicates that process 600 is to be paused or stopped, etc. In response to a determination that process 600 is complete, process 600 ends. In response to a determination that process 600 is not complete, process 600 returns to 610.

Figure 7A:
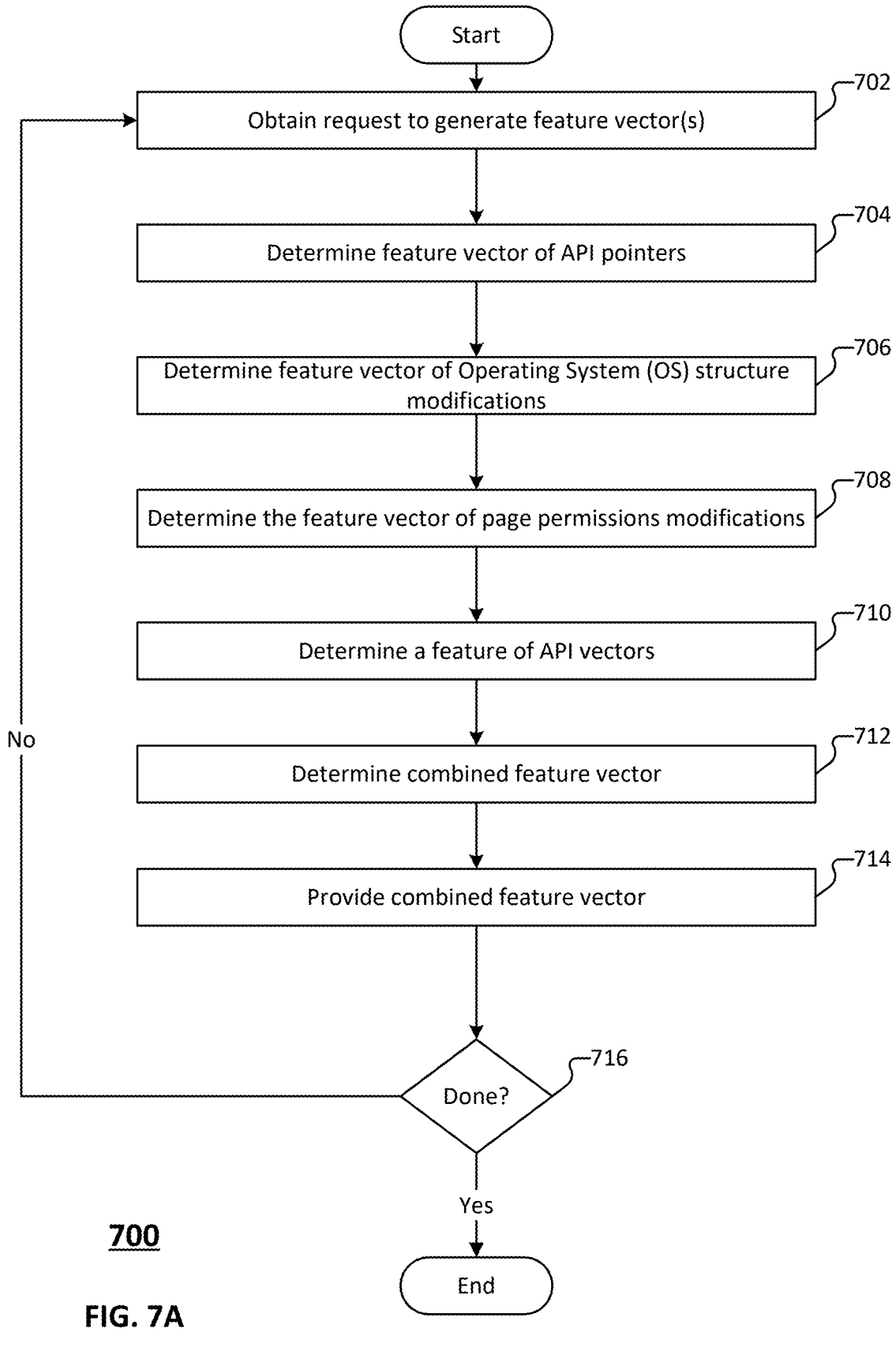
FIG. 7A is a flow diagram of a method for determining a combined vector to various embodiments.

FIG. 7A is a flow diagram of a method for determining a combined vector to various embodiments. In some embodiments, process 700 is implemented at least in part on by system 100 of FIG. 1 and/or system 200 of FIG. 2. In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment.

At 702, a request to generate a feature vector(s) is obtained. In some embodiments, the request to generate the feature vector(s) is received in connection with an analysis of a particular file. The request to generate the feature vector includes, or is communicated in connection with, information pertaining to a dynamic analysis of the file or a location at which such information may be obtained. For example, the request includes a set of memory artifacts, or a set of snapshots of a memory structure that are captured during execution of the particular file.

At 704, a feature vector corresponding to API pointers is determined. The API pointers correspond to pointers to APIs in memory, and indicate the set or types of APIs that the corresponding file is intending to use. The feature vector corresponding to API pointers characterizes a set of APIs invoked during execution of the particular file.

At 706, a feature vector corresponding to OS structure modifications is determined. The OS structure modifications can indicate if the file (e.g., the malware) is attempting to hide its presence by modifying the loaded process module list. The feature vector corresponding to OS structure modifications characterizes a set of modifications that are made during execution of the particular file such as in connection with the file attempting to hide its presence within the system in which the file is executed.

At 708, a feature vector corresponding to page permission modifications is determined. The page permission modifications can indicate whether the file (e.g., the malware) is modifying system memory to convert read only memory to writable/executable memory in connection with dynamically writing and executing code (e.g., a shellcode). The feature vector corresponding to page permission modifications characterizes a set of modifications that are made with respect to permissions during execution of the particular file.

At 710, a feature(s) corresponding to API vectors is determined. The API vectors can correspond to contiguous lists of API pointers in memory. Malware generally tends to allocate blocks of memory for dynamically resolving features. Accordingly, similar API vectors can be indicative of shared code across malware. The feature vector(S) corresponding to API vectors characterizes a set of APIs invoked, or patterns of invocation of APIs, during execution of the particular file.

At 712, a combined feature vector is determined. In some embodiments, the combined feature vector is based at least in part on a feature vector(s) corresponding to the API vectors. As example, the combined feature vector is determined based at least in part on a plurality of a page permission modification feature vector, an OS structure modification feature vector, an API pointer feature vector, and one or more API vector feature vectors. In some embodiments, the combined feature vector is obtained concatenating a page permission modification feature vector, an OS structure modification feature vector, an API pointer feature vector, and/or one or more API vector feature vectors. As an example, the set of feature vectors are concatenated according to a predefined process (e.g., predefined order, etc.). In some embodiments, the predefined order in which the feature vectors are concatenated is: (1) the page permission modification feature vector, (2) the OS structure modification feature vector, (3) the API pointer feature vector, and (4) the one or more API feature vectors.

At 714, the combined feature vector is provided. In some embodiments, the system provides the combined feature vector to another system or module, such as in response to the request for the feature vector(s) to be generated. The system provides the combined feature vector in connection with an input to a classifier that determines whether a file is malicious or a likelihood that the file is malicious.

At 716, a determination is made as to whether process 700 is complete. In some embodiments, process 700 is determined to be complete in response to a determination that no further feature vectors are to be determined such as with respect to files that are be analyzed (e.g., no further predictions for files are needed), an administrator indicates that process 700 is to be paused or stopped, etc. In response to a determination that process 700 is complete, process 700 ends. In response to a determination that process 700 is not complete, process 700 returns to 702.

Figure 7B:
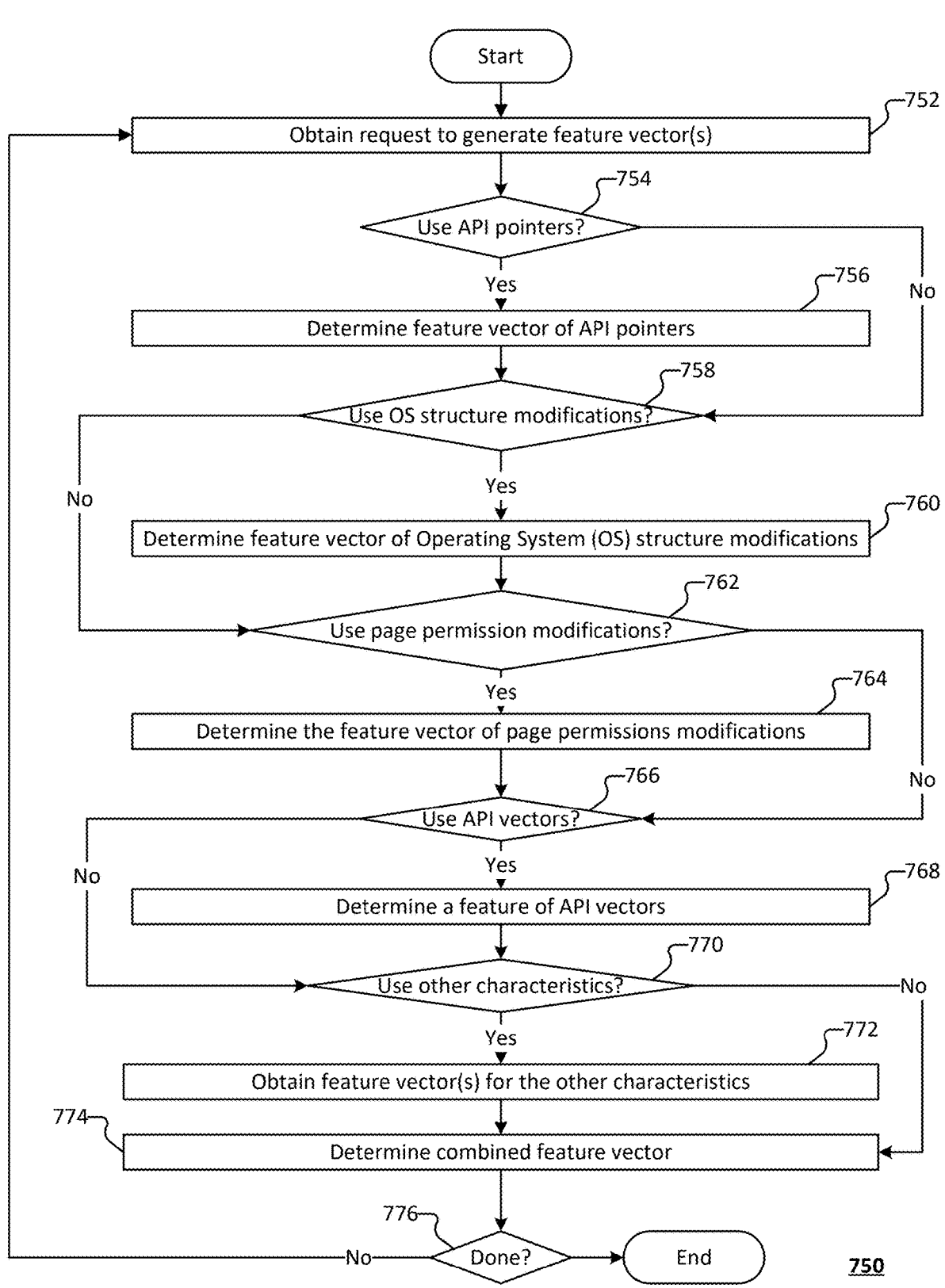
FIG. 7B is a flow diagram of a method for determining a combined vector to various embodiments.

FIG. 7B is a flow diagram of a method for determining a combined vector to various embodiments. In some embodiments, process 750 is implemented at least in part on by system 100 of FIG. 1 and/or system 200 of FIG. 2. In some implementations, process 750 may be implemented by one or more servers, such as in connection with providing a service to a network (e.g., a security entity and/or a network endpoint such as a client device). In some implementations, process 750 may be implemented by a security entity (e.g., a firewall) such as in connection with enforcing a security policy with respect to files communicated across a network or in/out of the network. In some implementations, process 750 may be implemented by a client device such as a laptop, a smartphone, a personal computer, etc., such as in connection with executing or opening a file such as an email attachment.

According to various embodiments, the system determines the feature vectors to generate in connection with assessing whether a file is malicious based at least in part on a predefined structure of a combined feature vector to be input to a classification model, or based on a predefined structure for determining the combined feature vector.

At 752, a request to generate a feature vector(s) is obtained. In some embodiments, the request to generate the feature vector(s) is received in connection with an analysis of a particular file. The request to generate the feature vector includes, or is communicated in connection with, information pertaining to a dynamic analysis of the file or a location at which such information may be obtained. For example, the request includes a set of memory artifacts, or a set of snapshots of a memory structure that are captured during execution of the particular file.

At 754, a determination is made as to whether information pertaining to API pointers is to be used in connection with determining whether the file is malicious. In some embodiments, the system determines whether an API pointer feature vector is to be used in generating a combined feature vector that is to be input to a classifier model for classifying the file as malicious (or a likelihood of malicious of the file).

In response to a determination that information pertaining to API pointers is to be used in connection with determining whether the file is malicious at 754, process 750 proceeds to 756 at which the feature vector of API pointers is determined. The API pointers correspond to pointers to APIs in memory, and indicate the set or types of APIs that the corresponding file is intending to use. The feature vector corresponding to API pointers characterizes a set of APIs invoked during execution of the particular file. Thereafter, process 750 proceeds to 758.

Examples of features pertaining to API pointers (e.g., which may be used in connection with the feature vector of API pointers) includes count-based features such as a pointer based on memory stack, a pointer based on a memory heap, a pointer based on a memory executable. Such features may be count based. Examples of features pertaining to API pointers includes TF-IDF based features such as ngram and skip-gram based tokens.

Conversely, in response to a determination that information pertaining to API pointers is not to be used in connection with determining whether the file is malicious at 754, process 750 proceeds to 758.

At 758, a determination is made as to whether information pertaining to OS structure modifications is to be used in connection with determining whether the file is malicious. In some embodiments, the system determines whether an OS structure modifications feature vector is to be used in generating a combined feature vector that is to be input to a classifier model for classifying the file as malicious (or a likelihood of malicious of the file).

In response to a determination that information pertaining to OS structure modifications is to be used in connection with determining whether the file is malicious at 758, process 750 proceeds to 760 at which the feature vector of OS structure modifications is determined. The OS structure modifications can indicate if the file (e.g., the malware) is attempting to hide its presence by modifying the loaded process module list. The feature vector corresponding to OS structure modifications characterizes a set of modifications that are made during execution of the particular file such as in connection with the file attempting to hide its presence within the system in which the file is executed. Thereafter, process 750 proceeds to 762.

Examples of features pertaining to OS structure modifications (e.g., which may be used in connection with the feature vector of OS structure modifications) includes modifications to a DLL name, a base address, a size of an image, an entry point, an image base address, an indicator indicating whether a debugging is occurring/performed, or files such as an .exe, a .drv, a dll, a dat, a .ocx, an .odf, a .tmp, a cpl, a riched20.dll, a comdlg32.ocx, an installoptions plugin, a system file, a srvcli file, a UAC (e.g., user access control), a userinfo class, an NS Process plugin, a decode, a dbghelp library, an ikavapit.exe file, langdll.dll, desktoplayer.exe, a dwmapi.h, nsexec2.dll, winnsi.dll, nsDialogs, winspool.drv, FindProcDll, msisip.dll, twext.dll, NetUtils library, SetupApi driver, Propsys.h, Propsys.drv, crypt32.dll, AdvSplash.dll, TvGetVersion.dll, devobj.dll, NsExec, url-mon.dll, URLDownloadToFile function, cfgmgr32.dll, NsJSON plugin, ws2_32.dll, ws2_32.lib, wtsapi32.dll, gdiplus.dll, msasn1.dll, cryptsp.dll, win32 API, wintrust.dll, inetc.dll, CPUDesc.d11. Such features may be count based.

Conversely, in response to a determination that information pertaining to OS structure modifications is not to be used in connection with determining whether the file is malicious at 758, process 750 proceeds to 762.

At 762, a determination is made as to whether information pertaining to page permission modifications is to be used in connection with determining whether the file is malicious. In some embodiments, the system determines whether page permission modifications feature vector is to be used in generating a combined feature vector that is to be input to a classifier model for classifying the file as malicious (or a likelihood of malicious of the file).

In response to a determination that information pertaining to page permission modifications is to be used in connection with determining whether the file is malicious at 762, process 750 proceeds to 764 at which the feature vector of page permission modifications is determined. The page permission modifications can indicate whether the file (e.g., the malware) is modifying system memory to convert read only memory to writable/executable memory in connection with dynamically writing and executing code (e.g., a shellcode). The feature vector corresponding to page permission modifications characterizes a set of modifications that are made with respect to permissions during execution of the particular file. Thereafter, process 750 proceeds to 766.

Examples of features pertaining to page permission modifications (e.g., which may be used in connection with the feature vector of page permissions modifications) includes modifications to (hw:WX) executable, (hw:WX) None, (hw:WX)_stack, (hw:WX)_heap, (hw:W) executable, (hw:W) None, (hw:W)_stack, (hw:W)_heap, (hw: X)_executable, (hw:X) None, (hw:X)_stack, (hw:X)_heap, (hw:) executable, (hw:) None, (hw:)_stack, (hw:)_heap. Such features may be count based.

Conversely, in response to a determination that information pertaining to page permission modifications is not to be used in connection with determining whether the file is malicious at 762, process 750 proceeds to 766.

At 766, a determination is made as to whether information pertaining to API vectors are to be used in connection with determining whether the file is malicious. In some embodiments, the system determines whether API vectors feature vector(s) are to be used in generating a combined feature vector that is to be input to a classifier model for classifying the file as malicious (or a likelihood of malicious of the file).

In response to a determination that information pertaining to API vectors are to be used in connection with determining whether the file is malicious at 766, process 750 proceeds to 768 at which the feature vector(s) of API vectors is determined. The API vectors can indicate patterns of APIs invoked during execution of a sample. Thereafter, process 750 proceeds to 770.

Examples of features pertaining to API vectors (e.g., which may be used in connection with the feature vector of API vectors) includes count-based features such as a total number of vectors, a memory type, or a memory type process. Such features may be count based. Examples of features pertaining to API vectors includes TF-IDF based features such as ngram and skip-gram based tokens. Examples of pertaining to API vectors includes deep-learning based features such as an n-dimensional vector extracted from a transformer-based classifier (e.g., a 128-dimensional vector), etc. In some embodiments, features pertaining to API vectors are determined based at least in part on implementing a machine learning process. Examples of machine learning processes (e.g., a deep learning process) that can be implemented in connection with determining API vectors include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, deep learning models on subgraph sequences from Bipartite graphs, etc. In some embodiments, the model is trained using an XGBoost machine learning classifier model. Inputs to the classifier (e.g., the XGBoost machine learning classifier model) is a combined feature vector or set of feature vectors, and based on the combined feature vector or set of feature vectors the classifier model determines whether the corresponding file is malicious, or a likelihood that the file is malicious.

Conversely, in response to a determination that information pertaining to API vectors is not to be used in connection with determining whether the file is malicious at 766, process 750 proceeds to 770.

At 770, a determination is made as to whether other characteristics are to be used to determine whether a file is malicious, or otherwise in connection with generating a combined feature vector to be input to a classification model.

In response to a determination that other characteristics are to be used in connection with determining whether the file is malicious at 770, process 750 proceeds to 772 at which the feature vector(s) for the other characteristics is determined. Thereafter, process 750 proceeds to 774. Conversely, in response to a determination that other characteristics are not to be used in connection with determining whether the file is malicious at 766, process 750 proceeds to 774.

At 774, the combined feature vector is determined. In some embodiments, the combined feature vector is based at least in part on a feature vector(s) corresponding to the API vectors. As example, the combined feature vector is determined based at least in part on a plurality of a page permission modification feature vector, an OS structure modification feature vector, an API pointer feature vector, and one or more API vector feature vectors. In some embodiments, the combined feature vector is obtained concatenating the page permission modification feature vector, an OS structure modification feature vector, an API pointer feature vector, and/or one or more API vector feature vectors. As an example, the set of feature vectors are concatenated according to a predefined process (e.g., predefined order, etc.). In some embodiments, the predefined order in which the feature vectors are concatenated is: (1) the page permission modification feature vector, (2) the OS structure modification feature vector, (3) the API pointer feature vector, and (4) the one or more API feature vectors.

At 776, a determination is made as to whether process 750 is complete. In some embodiments, process 750 is determined to be complete in response to a determination that no further feature vectors are to be determined such as with respect to files that are be analyzed (e.g., no further predictions for files are needed), an administrator indicates that process 750 is to be paused or stopped, etc. In response to a determination that process 750 is complete, process 750 ends. In response to a determination that process 750 is not complete, process 750 returns to 752.

Figure 8:
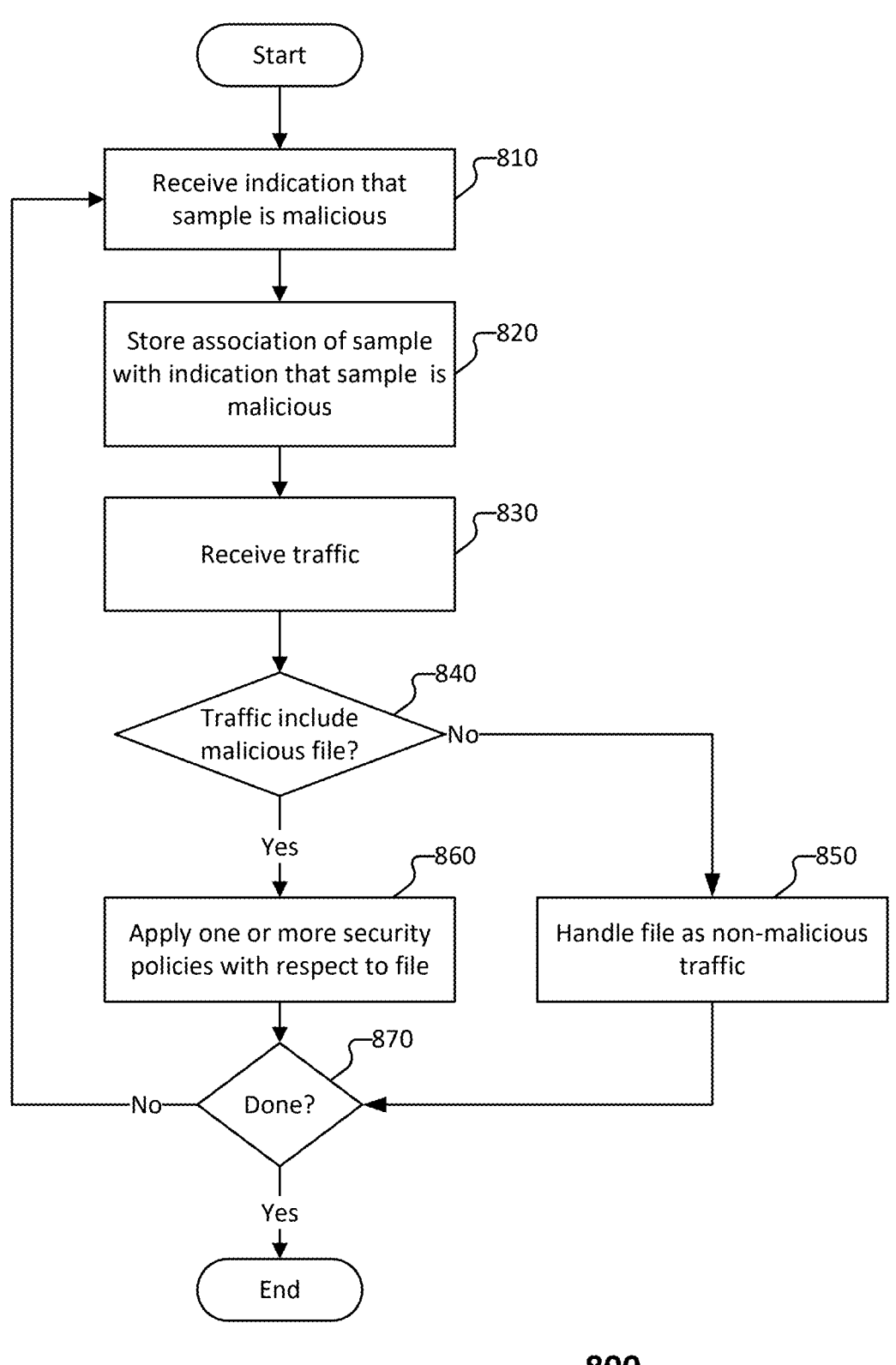
FIG. 8 is a flow diagram of a method for detecting a malicious file according to various embodiments.

FIG. 8 is a flow diagram of a method for detecting a malicious file according to various embodiments. In some embodiments, process 800 is implemented at least in part on by system 100 of FIG. 1. In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to files communicated across a network or in/out of the network. In some implementations, process 800 may be implemented by a client device such as a laptop, a smartphone, a personal computer, etc., such as in connection with executing or opening a file such as an email attachment.

At 810, an indication that the sample is malicious is received. In some embodiments, the system receives an indication that a sample is malicious, and the sample or hash, signature, or other unique identifier associated with the sample. For example, the system may receive the indication that the sample is malicious from a service such as a security or malware service. The system may receive the indication that the sample is malicious from one or more servers.

According to various embodiments, the indication that sample is malicious is received in connection with an update to a set of previously identified malicious files. For example, the system receives the indication that the sample is malicious as an update to a blacklist of malicious files.

At 820, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received files are malicious. In some embodiments, the identifier corresponding to the sample stored in association with the indication that the sample is malicious comprises a hash of the file (or part of the file), a signature of the file (or part of the file), or another unique identifier associated with the file.

At 830, traffic is received. The system may obtain traffic such as in connection with routing traffic within/across a network, or mediating traffic into/out of a network such as a firewall, or a monitoring of email traffic or instant message traffic.

At 840, a determination of whether the traffic includes a malicious file is performed. In some embodiments, the system obtains the file from the received traffic. For example, the system identifies the file as an attachment to an email, identifies the file as being exchanged between two client devices via instant message program or other file exchange program, etc. In response to obtaining the file from the traffic, the system determines whether the file corresponds to a file comprised in a set of previously identified malicious files such as a blacklist of malicious files. In response to determining that the file is comprised in the set of files on the blacklist of malicious files, the system determines that the file is malicious (e.g., the system may further determine that the traffic includes the malicious file).

In some embodiments, the system determines whether the file corresponds to a file comprised in a set of previously identified benign files such as a whitelist of benign files. In response to determining that the file is comprised in the set of files on the whitelist of benign files, the system determines that the file is not malicious (e.g., the system may further determine that the traffic includes the malicious file).

According to various embodiments, in response to determining the file is not comprised in a set of previously identified malicious files (e.g., a blacklist of malicious files) or a set of previously identified benign files (e.g., a whitelist of benign files), the system deems the file as being non-malicious (e.g., benign).

According to various embodiments, in response to determining the file is not comprised in a set of previously identified malicious files (e.g., a blacklist of malicious files) or a set of previously identified benign files (e.g., a whitelist of benign files), the system queries a malicious file detector to determine whether the file is malicious. For example, the system may quarantine the file until the system receives response form the malicious file detector as to whether the file is malicious. The malicious file detector may perform an assessment of whether the file is malicious such as contemporaneous with the handling of the traffic by the system (e.g., in real-time with the query from the system). The malicious file detector may correspond to malicious file detector 170 of system 100 of FIG. 1 and/or system 200 of FIG. 2.

In some embodiments, the system determines whether the file is comprised in the set of previously identified malicious files or the set of previously identified benign files by computing a hash or determining a signature or other unique identifier associated with the file, and performing a lookup in the set of previously identified malicious files or the set of previously identified benign files for a file matching the hash, signature or other unique identifier. Various hashing techniques may be implemented.

In response to a determination that the traffic does not include a malicious file at 840, process 800 proceeds to 850 at which the file is handled as non-malicious traffic/information.

In response to a determination that the traffic does not include a malicious file at 840, process 800 proceeds to 860 at which the file is handled as malicious traffic/information.

The system may handle the malicious traffic/information based at least in part on one or more policies such as one or more security policies.

According to various embodiments, the handling of the file malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

At 870, a determination is made as to whether process 800 is complete. In some embodiments, process 800 is determined to be complete in response to a determination that no further samples are to be analyzed (e.g., no further predictions for files are needed), an administrator indicates that process 800 is to be paused or stopped, etc. In response to a determination that process 800 is complete, process 800 ends. In response to a determination that process 800 is not complete, process 800 returns to 810.

Figure 9:
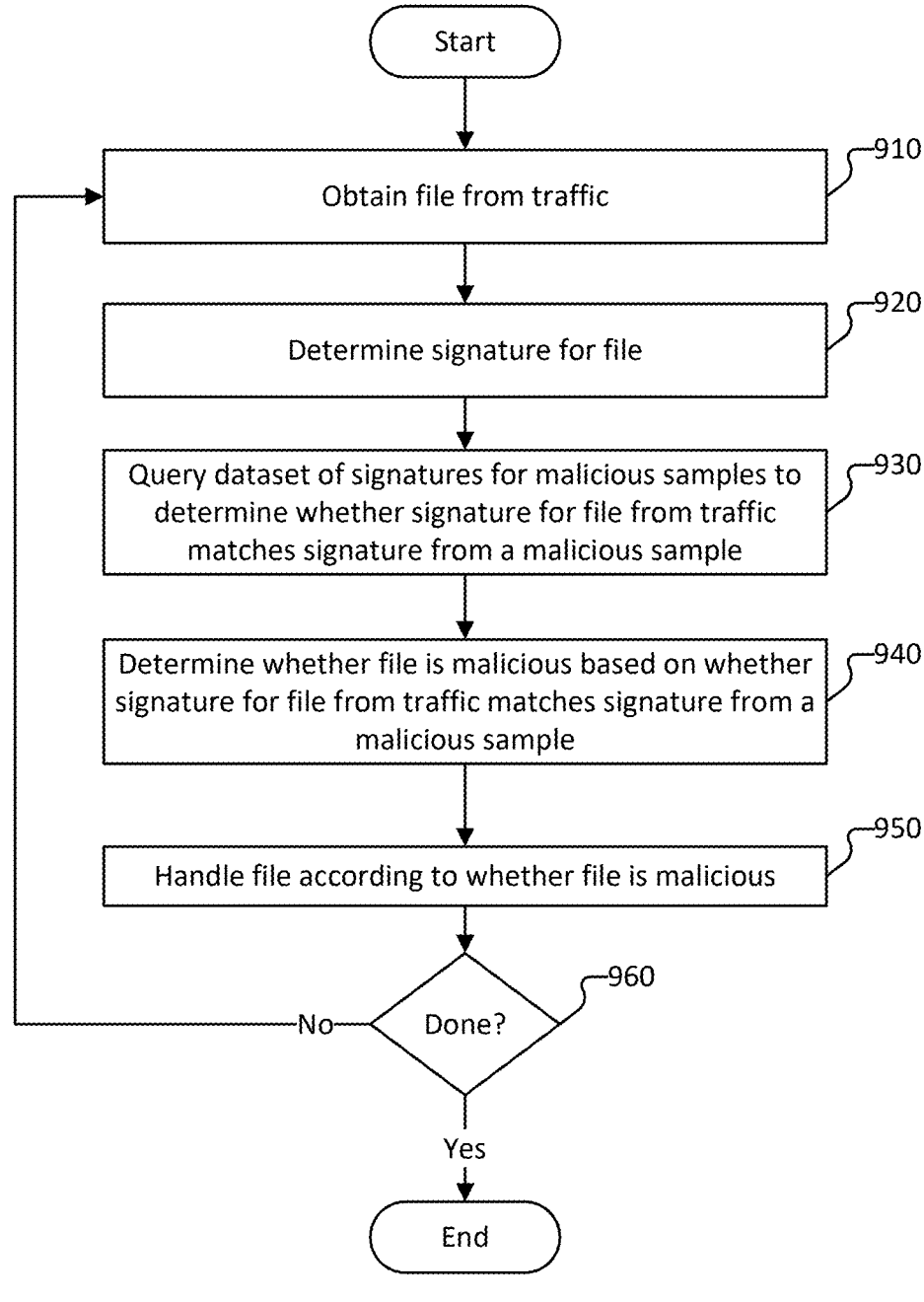
FIG. 9 is a flow diagram of a method for detecting a malicious file according to various embodiments.

FIG. 9 is a flow diagram of a method for detecting a malicious file according to various embodiments. In some embodiments, process 900 is implemented at least in part on by system 100 of FIG. 1 and/or system 200 of FIG. 2. In some implementations, process 900 may be implemented by a security entity (e.g., a firewall) such as in connection with enforcing a security policy with respect to files communicated across a network or in/out of the network, and/or an anti-malware application running on a client system, etc. In some implementations, process 900 may be implemented by a client device such as a laptop, a smartphone, a personal computer, etc., such as in connection with executing or opening a file such as an email attachment.

In some embodiments, process 900 is invoked by 840 of process 800 of FIG. 8.

At 910 a file is obtained from traffic. The system may obtain traffic such as in connection with routing traffic within/across a network, or mediating traffic into/out of a network such as a firewall, or a monitoring of email traffic or instant message traffic. In some embodiments, the system obtains the file from the received traffic. For example, the system identifies the file as an attachment to an email, identifies the file as being exchanged between two client devices via instant message program or other file exchange program, etc.

At 920, a signature corresponding to the file is determined. In some embodiments, the system computes a hash or determines a signature or other unique identifier associated with the file. Various hashing techniques may be implemented. For example, the hashing technique may be the determining (e.g., computing) the MD5 hash for a file.

At 930, a dataset for signatures of malicious samples is queried to determine whether the signature corresponding to the file matches a signature from a malicious sample. In some embodiments, the system performing a lookup in the dataset for signatures of malicious samples for a file matching the hash, signature or other unique identifier. The dataset for signatures of malicious samples may be stored locally at the system or remotely on a storage system that is accessible to the system.

At 940, a determination of whether the file is malicious is made based at least in part on whether a signature for the file matches a signature for a malicious sample. In some embodiments, the system determines whether the dataset of malicious signature comprises a record matching the signature for the file obtained from traffic. In response to determining that the historical dataset comprises an indication that a file corresponding to the dataset for signatures of malicious samples is malicious (e.g., the hash of the file is included in a blacklist of fields), the system deems the file obtained from the traffic at 910 to be malicious.

At 950, the file is handled according to whether the file is malicious. In some embodiments, in response to determining that the file is malicious, the system applies one or more security policies with respect to the file. In some embodiments, in response to determining that the file is not malicious, the system handles the file as being benign (e.g., the file is handled as normal traffic).

At 960, a determination is made as to whether process 900 is complete. In some embodiments, process 900 is determined to be complete in response to a determination that no further samples are to be analyzed (e.g., no further predictions for files are needed), an administrator indicates that process 900 is to be paused or stopped, etc. In response to a determination that process 900 is complete, process 900 ends. In response to a determination that process 900 is not complete, process 900 returns to 910.

Figure 10:
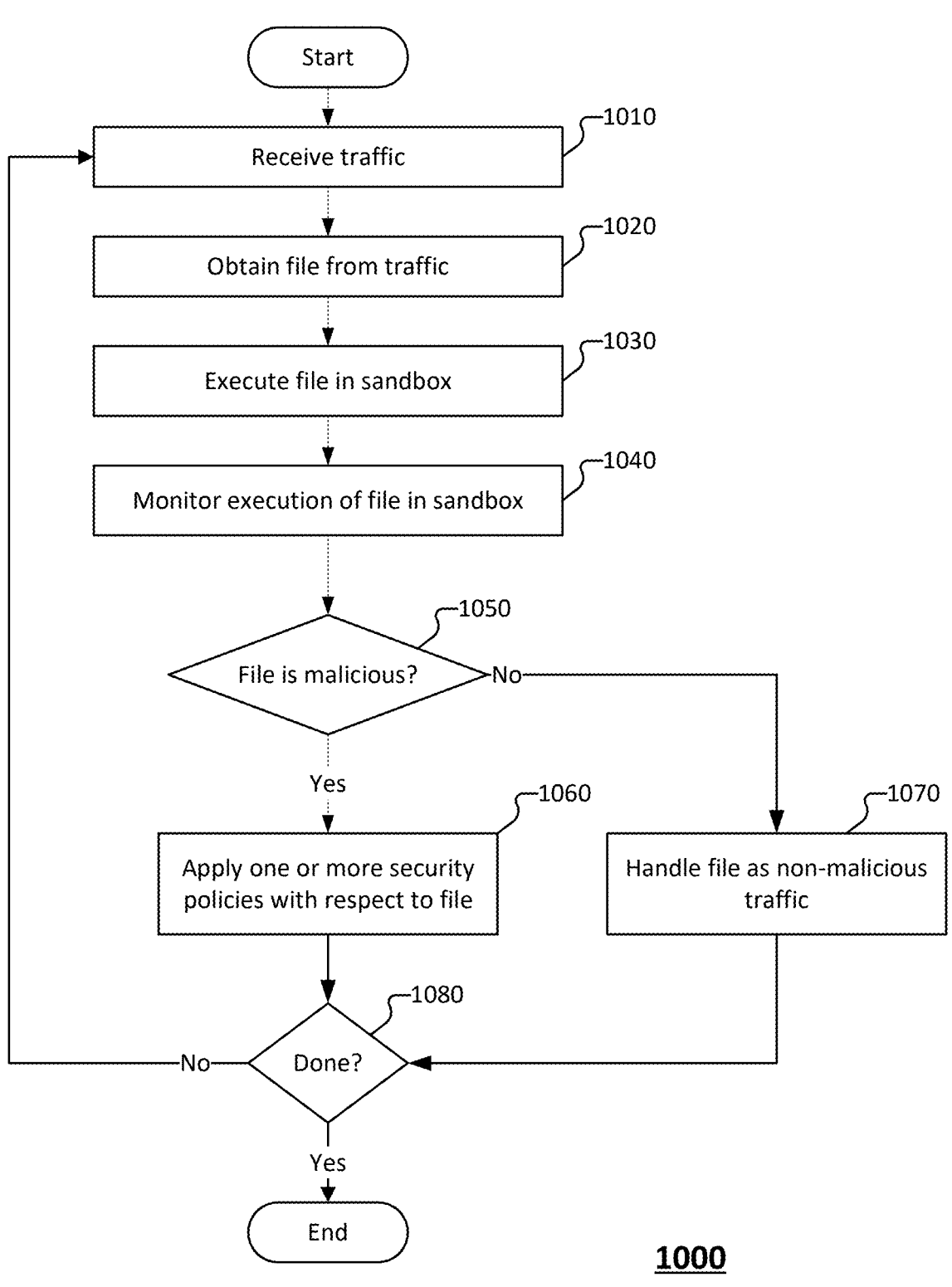
FIG. 10 is a flow diagram of a method for detecting a malicious file according to various embodiments.

FIG. 10 is a flow diagram of a method for detecting a malicious file according to various embodiments.

At 1010, traffic is received. The system may obtain traffic such as in connection with routing traffic within/across a network, or mediating traffic into/out of a network such as a firewall, or a monitoring of email traffic or instant message traffic.

At 1020 a file is obtained from traffic. The system may obtain traffic such as in connection with routing traffic within/across a network, or mediating traffic into/out of a network such as a firewall, or a monitoring of email traffic or instant message traffic. In some embodiments, the system obtains the file from the received traffic. For example, the system identifies the file as an attachment to an email, identifies the file as being exchanged between two client devices via instant message program or other file exchange program, etc.

At 1030, the file is executed in a sandbox. The system can provide the file to a malicious file detector that causes the file to execute in the sandbox. In some embodiments, the system instantiates a sandbox (e.g., in a virtual machine).

At 1040, execution of the file in the sandbox is monitored. In some embodiments, the system performs a dynamic analysis of the file. For example, the system obtains (e.g., determines) memory artifacts associated with the execution of the sample. In some embodiments, the system iteratively performs a snapshotting of at least part of the memory structure (e.g., a memory structure associated with the sandbox). The monitoring the execution of the sample in the sandbox can include monitoring changes in memory after a system call event during execution of the sample in the sandbox. The system may perform a snapshotting of at least part of the memory in response to the monitoring of the execution of the sample. For example, the system performs a snapshotting of the memory structure each time a function/selected system APIs is called. The call stack can be inspected to determine whether any return address in the call stack points to a memory address that has changed since the first/previous image of memory was performed, and if so, another snapshot can be performed which can be utilized to identify a subset of the pages in memory that have changed since the first/previous image of memory.

In some embodiments, 1030 and 1040 are performed in parallel or contemporaneously.

At 1050, a determination of whether the file is malicious is performed. In some embodiments, the system determines whether the sample is malicious based at least in part on the monitoring of the execution of the sample in the sandbox.

In response to a determination that the traffic does not include a malicious file at 1050, process 1000 proceeds to 1060 at which the file is handled as malicious traffic/information. The system may handle the malicious traffic/information based at least in part on one or more policies such as one or more security policies.

According to various embodiments, the handling of the file malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

In response to a determination that the traffic does not include a malicious file at 1050, process 1000 proceeds to 1070 at which the file is handled as non-malicious traffic/information.

At 1080, a determination is made as to whether process 1000 is complete. In some embodiments, process 1000 is determined to be complete in response to a determination that no further models are to be determined/trained (e.g., no further classification models are to be created), an administrator indicates that process 1000 is to be paused or stopped, etc. In response to a determination that process 1000 is complete, process 1000 ends. In response to a determination that process 1000 is not complete, process 1000 returns to 1010.

Figure 11:
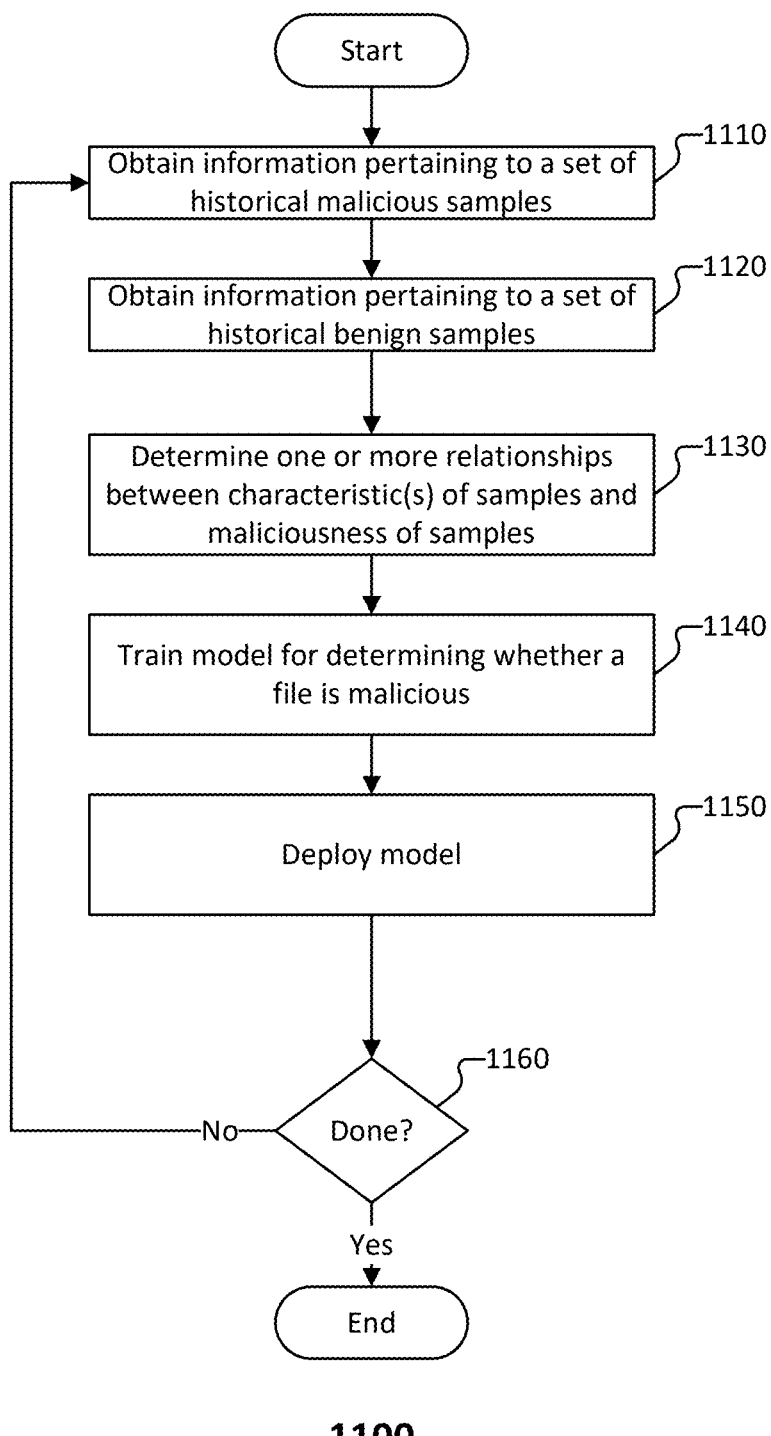
FIG. 11 is a flow diagram of a method for training a model to detect malicious files to various embodiments.

FIG. 11 is a flow diagram of a method for training a model to detect malicious files to various embodiments. In some embodiments, process 1100 is implemented at least in part on by system 100 of FIG. 1 and/or system 200 of FIG. 2.

At 1110, information pertaining to a set of historical malicious samples is obtained. In some embodiments, the system obtains the information pertaining to a set of historical malicious samples from a third-party service (e.g., VirusTotal™). In some embodiments, the system obtains the information pertaining to a set of historical malicious samples based at least in part on executing the samples known to be malicious and performing a dynamic analysis of the malicious samples (e.g., performing iterative snapshotting of the state of the sandbox or memory structure of the sandbox, etc.).

At 1120, information pertaining to a set of historical benign samples is obtained. In some embodiments, the system obtains the information pertaining to a set of historical benign samples from a third-party service (e.g., VirusTotal™). In some embodiments, the system obtains the information pertaining to a set of historical benign samples based at least in part on executing the samples known to be benign and performing a dynamic analysis of the samples (e.g., performing iterative snapshotting of the state of the sandbox or memory structure of the sandbox, etc.).

At 1130, one or more relationships between characteristics of samples and maliciousness of samples is determined. In some embodiments, the system determines features pertaining to whether a file is malicious or a likelihood that a file is malicious. The features that are determined include features with respect one or more of (i) API pointers, (ii) API vectors, (iii) page permission modifications, and/or (iv) OS structure modifications.

In some embodiments, the determining one or more relationships between characteristics of samples and maliciousness of samples includes determining at least features with respect to API vectors that are observed during a dynamic analysis (e.g., monitored during execution of the files). The determining the one or more relationships between characteristics of samples and maliciousness of samples includes determining patterns of invocations of APIs during execution of the files, such as sequences of APIs invoked (e.g., a set of contiguous APIs).

The determining one or more relationships between characteristics of samples and maliciousness of samples includes analyzing information pertaining to memory artifacts or memory structures that is obtained during execution of the samples (e.g., the malicious samples and/or benign samples). For example, the system analyzes a set of snapshots (e.g., sequential snapshots) of the state of the system in which the samples are executed, such as snapshots of memory structures or characteristics of the memory structures.

At 1140, a model is trained for determining whether a file is malicious. In some embodiments, the model is a machine learning model that is trained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model is trained using an XGBoost machine learning classifier model. Inputs to the classifier (e.g., the XGBoost machine learning classifier model) is a combined feature vector or set of feature vectors, and based on the combined feature vector or set of feature vectors the classifier model determines whether the corresponding file is malicious, or a likelihood that the file is malicious.

At 1150, the model is deployed. In some embodiments, the deploying the model includes storing the model in a dataset of models for use in connection with analyzing files to determine whether the files are malicious. The deploying the model can include providing the model (or a location at which the model can be invoked) to a malicious file detector, such as malicious file detector 170 of system 100 of FIG. 1, or to system 200 of FIG. 2.

At 1160, a determination is made as to whether process 1100 is complete. In some embodiments, process 1100 is determined to be complete in response to a determination that no further models are to be determined/trained (e.g., no further classification models are to be created), an administrator indicates that process 1100 is to be paused or stopped, etc. In response to a determination that process 1100 is complete, process 1100 ends. In response to a determination that process 1100 is not complete, process 1100 returns to 1110.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
  execute a sample in a virtual environment;
  determine whether the sample is malicious based at least in part on memory-use artifacts obtained in connection with execution of the sample in the virtual environment, wherein:
    determining whether the sample is malicious is based at least in part on a machine learning classifier;
    the machine learning classifier uses a feature of application programming interface (API) vectors;
    the API vectors are determined based at least in part on determining a set of API pointers for which the sample allocates memory, and determining based on the set of API pointers a set of contiguous API vectors; and
    the feature of API vectors is based at least in part on a contiguous list of pointers in memory; and
a memory coupled to the one or more processors and configured to provide one or more processors with instructions.

2. The system of claim 1, wherein the machine learning classifier uses a combined feature vector to detect malware.

3. The system of claim 2, wherein the combined feature vector is based at least in part on one or more of (i) a feature vector of application programming interface (API) pointers, (ii) a feature vector of Operating System (OS) structure modifications, (iii) a feature vector of page permissions modifications, and (iv) a feature of API vectors.

4. The system of claim 3, wherein the combined feature vector is a concatenation of (i) the feature vector of application programming interface (API) pointers, (ii) the feature vector of Operating System (OS) structure modifications, (iii) the feature vector of page permissions modifications, and (iv) the feature of API vectors.

5. The system of claim 1, wherein the machine learning classifier uses a feature vector of application programming interface (API) pointers to detect malware.

6. The system of claim 1, wherein the machine learning classifier uses a feature vector of Operating System (OS) structure modifications to detect malware.

7. The system of claim 1, wherein the machine learning classifier uses a feature vector of page permissions modifications to detect malware.

8. The system of claim 1, wherein the machine learning model is based on an XGBoost machine learning classifier model.

9. The system of claim 1, wherein the one or more processors are further configured to monitor a behavior of the sample during execution of the sample in the virtual environment.

10. The system of claim 9, wherein to monitor the behavior of the sample includes monitoring modification made in the virtual environment during execution.

11. The system of claim 9, wherein to monitor the behavior of the sample comprises a dynamic analysis of an execution of the sample.

12. The system of claim 1, wherein the one or more processors are further configured to receive the sample.

13. The system of claim 1, wherein the one or more processors are further configured to:
  send, to a security entity, an indication that the sample is malicious.

14. The system of claim 1, wherein the one or more processors are further configured to:
  enforce one or more security policies based on a determination of whether the sample is malicious.

15. The system of claim 1, wherein the sample performs one or more anti-emulation or dynamic analysis evasion techniques.

16. The system of claim 1, wherein the one or more processors are further configured to:
  in response to determining the sample is malicious, update a blacklist of SQL or command injection strings that are deemed to be malicious, the blacklist of SQL or command injection strings being updated to include an identifier corresponding to the sample.

17. The system of claim 1, wherein the feature of API vectors comprises information for a plurality of API vectors.

18. The system of claim 1, wherein the feature of API vectors comprises information pertaining to a plurality of API vectors within a predefined proximity of each other in the memory.

19. The system of claim 1, wherein the feature of API vectors is determined based at least in part on a set of tuples for the APIs for which memory is allocated during execution of the sample, and each tuple comprises information pertaining to an API pointer and information pertaining to a memory location for the API pointer.

20. A method, comprising:
executing a sample in a virtual environment; and
determining whether the sample is malicious based at least in part on memory-use artifacts obtained in connection with execution of the sample in the virtual environment, wherein:
  determining whether the sample is malicious is based at least in part on a machine learning classifier;
  the machine learning classifier uses a feature of application programming interface (API) vectors;
  the API vectors are determined based at least in part on determining a set of API pointers for which the sample allocates memory, and determining based on the set of API pointers a set of contiguous API vectors; and
  the feature of API vectors is based at least in part on a contiguous list of pointers in memory.

21. A computer program product embodied in a non-transitory computer readable medium and comprising computer instructions for:
executing a sample in a virtual environment; and
determining whether the sample is malicious based at least in part on memory-use artifacts obtained in connection with execution of the sample in the virtual environment, wherein:
  determining whether the sample is malicious is based at least in part on a machine learning classifier;
  the machine learning classifier uses a feature of application programming interface (API) vectors;
  the API vectors are determined based at least in part on determining a set of API pointers for which the sample allocates memory, and determining based on the set of API pointers a set of contiguous API vectors; and the feature of API vectors is based at least in part on a contiguous list of pointers in memory.

22. A system, comprising:

one or more processors configured to:

execute a sample in a virtual environment;

determine whether the sample is malicious based at least in part on memory-use artifacts obtained in connection with execution of the sample in the virtual environment, wherein:

determining whether the sample is malicious is based at least in part on a machine learning classifier;

the machine learning classifier uses a feature of application programming interface (API) vectors;

the feature of API vectors is based at least in part on a contiguous list of pointers in memory; and the feature of API vectors comprises information pertaining to a plurality of API vectors within a predefined proximity of each other in the memory; and a memory coupled to the one or more processors and configured to provide one or more processors with instructions.

23. A method, comprising:

executing a sample in a virtual environment; and determining whether the sample is malicious based at least in part on memory-use artifacts obtained in connection with execution of the sample in the virtual environment, wherein:

determining whether the sample is malicious is based at least in part on a machine learning classifier;

the machine learning classifier uses a feature of application programming interface (API) vectors;

the feature of API vectors is based at least in part on a contiguous list of pointers in memory; and the feature of API vectors comprises information pertaining to a plurality of API vectors within a predefined proximity of each other in the memory.

24. A system, comprising:

one or more processors configured to:

execute a sample in a virtual environment;

determine whether the sample is malicious based at least in part on memory-use artifacts obtained in connection with execution of the sample in the virtual environment, wherein:

determining whether the sample is malicious is based at least in part on a machine learning classifier;

the machine learning classifier uses a feature of application programming interface (API) vectors;

the feature of API vectors is based at least in part on a contiguous list of pointers in memory; and the feature of API vectors is determined based at least in part on a set of tuples for the APIs for which memory is allocated during execution of the sample, and each tuple comprises information pertaining to an API pointer and information pertaining to a memory location for the API pointer; and a memory coupled to the one or more processors and configured to provide one or more processors with instructions.

25. A method, comprising:

executing a sample in a virtual environment; and determining whether the sample is malicious based at least in part on memory-use artifacts obtained in connection with execution of the sample in the virtual environment, wherein:

determining whether the sample is malicious is based at least in part on a machine learning classifier;

the machine learning classifier uses a feature of application programming interface (API) vectors;

the feature of API vectors is based at least in part on a contiguous list of pointers in memory; and the feature of API vectors is determined based at least in part on a set of tuples for the APIs for which memory is allocated during execution of the sample, and each tuple comprises information pertaining to an API pointer and information pertaining to a memory location for the API pointer.

* * * * *